US 008443011B2

(12) United States Patent
Kandlikar et al.

(10) Patent No.: US 8,443,011 B2
(45) Date of Patent: May 14, 2013

(54) GRAPHICAL STORAGE SYSTEM VISUALIZATION, TIMELINE BASED EVENT VISUALIZATION, AND STORAGE SYSTEM CONFIGURATION VISUALIZATION

(75) Inventors: Yogesh Kandlikar, Sunnyvale, CA (US); Diana Bocskai, Sunnyvale, CA (US); Art Cruz, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 1031 days.

(21) Appl. No.: 12/114,437

(22) Filed: May 2, 2008

(65) Prior Publication Data

US 2009/0276714 A1    Nov. 5, 2009

Related U.S. Application Data

(60) Provisional application No. 61/049,377, filed on Apr. 30, 2008.

(51) Int. Cl.
*G06F 17/30* (2006.01)
(52) U.S. Cl.
USPC .......................................... 707/805
(58) Field of Classification Search .................. None
See application file for complete search history.

(56) References Cited

U.S. PATENT DOCUMENTS

| | | | |
|---|---|---|---|
| 6,538,669 B1 | 3/2003 | Lagueux, Jr. et al. | |
| 7,315,985 B1 * | 1/2008 | Gauvin et al. | 715/734 |
| 2002/0007407 A1 * | 1/2002 | Klein | 709/225 |
| 2002/0049778 A1 * | 4/2002 | Bell et al. | 707/200 |
| 2003/0093619 A1 * | 5/2003 | Sugino et al. | 711/114 |
| 2003/0145041 A1 | 7/2003 | Dunham et al. | |
| 2007/0254922 A1 * | 11/2007 | Hiraiwa et al. | 514/338 |
| 2007/0271285 A1 * | 11/2007 | Eichorn et al. | 707/101 |

FOREIGN PATENT DOCUMENTS

WO    WO-2004003783 A1    1/2004

OTHER PUBLICATIONS

"Timeline has Graduated"; http://simile.mit.edu/timeline/; 1-3 pages; Feb. 11, 2009.
"Simile-Widgets"; http://code.google.com/p/simile-widgets; pp. 1-3; Feb. 11, 2009.
"Timeline Basics"; http://simile.mit.edu/timeline/docs/basics.html; pp. 1-2; Feb. 11, 2009.
International Search Report PCT/US2009/042179; dated Sep. 30, 2009; pp. 1-3.
Written Opinion PCT/US2009/042179; dated Sep. 30, 2009; pp. 1-5.

* cited by examiner

*Primary Examiner* — Bai D. Vu
(74) *Attorney, Agent, or Firm* — Perkins Coie LLP

(57) ABSTRACT

A method and system for visually displaying and navigating a computer storage system are disclosed. The storage system can be graphically browsed to select a particular entity in the storage system. A graphical timeline of events relating to the selected entity is displayed. Selecting an event from the timeline displays a graphical representation of the storage system at a time relating to the selected event or additional graphical detail about the selected event. Based on the selected event, configuration information for the entity in the storage system that experienced the event can be displayed and compared against the configuration of the entity at a different time or against a predefined template.

20 Claims, 20 Drawing Sheets

| | | | | | | | | Welcome, User 1 |
|---|---|---|---|---|---|---|---|---|
| | | | | | | | | Help  Feedback  Log Out |

802 — Search >> Big. Corp-

| | | Systems | Warnings | Notices | | AutoSupport Disabled | SupportEdge Premium |
|---|---|---|---|---|---|---|---|
| | | 27 | 0 | 0 | | 24 | 11 |

804 — Systems  806 — Graph  808 — History

810 — Displaying systems 1 - 5 of 5

|◄ ◄| Page [1] of 2 |► ►| ○

| Hostname ▲ | Serial # | System Id | Customer | Site | Group | Premium | AutoSupport | Warnings | Notices | Model |
|---|---|---|---|---|---|---|---|---|---|---|
| Host1 | 12345 | 12345 | Big. Corp. | Anytown | ABC | Yes | ON | 0 | 0 | FAS3020-R5 |
| Host2 | 12345 | 12345 | Big. Corp. | Anytown | ABC | Yes | ON | 0 | 0 | FAS3020-R5 |
| Host3 | 12345 | 12345 | Big. Corp. | Anytown | ABC | Yes | ON | 0 | 0 | FAS3020-R5 |
| | 12345 | 12345 | Big. Corp. | Anytown | | Yes | OFF | 0 | 0 | V3020-R5 |
| | 12345 | 12345 | Big. Corp. | Anytown | | Yes | OFF | 0 | 0 | V3020-R5 |

Please select one of the following AutoSupports:

200709275651  System Notification (DISK_FAIL -Bypassed by ESH) WARNING

200709275656  System Notification (DISK_FAIL -Bypassed by ESH) WARNING

200709275660  System Notification (SYSTEM CONFIGURATION ERROR)ERROR

200709275663  System Notification (REBOOT(reboot command)) INFO

200709279287  System Notification (DISK_FAIL -Bypassed by ESH) WARNING

200709279290  System Notification (SYSTEM CONFIGURATION ERROR)ERROR

200709279291  System Notification (REBOOT(reboot command)) INFO

1002

CANCEL

FSRV1-KR (Sat, Sept 21, 2007)- (WEEKLY_LOG) IN

1902

Search >> Big. Corp->> Seol HQ >> FSRV1-KR

Visualization  Upgrade Advisor  Configurations  Raw Data
1904          1906

1908 Help  Feedback  Log Out
Welcome, User 1
1910

1920
Cluster Notification (WEEKLY_LOG)INFO
20070923161635
Host1  Sun. Sep. 23, 2007

Recently Viewed
1922
20070975889

1930
Current AutoSupport  Save as Template: [ ▾ ]  SAVE  1932

AutoSupport Date:  Sun. Sep. 23, 2007
          Subject:  Cluster Notification (WEEKLY)
        Hostname:  Host1
   Serial Number:  12345
       System ID:  12345
            Model:  FAS890
       OS Version:  7.0.4PTD5

Compare To:                                    1934
» Golden Template
» Recently Viewed AutoSupport [ ▾ ]

[A] Entire Configuration

GRAPHICAL STORAGE SYSTEM VISUALIZATION, TIMELINE BASED EVENT VISUALIZATION, AND STORAGE SYSTEM CONFIGURATION VISUALIZATION

FIELD OF INVENTION

The present invention generally relates to computer data storage systems, and in particular, relates to an apparatus and methods to graphically browse the storage system, to graphically view events that occur in the storage system, and to view the configuration of the storage system.

BACKGROUND

A file server (also known as a "filer") is a computer that provides file services relating to the organization of information on storage devices, such as disks. The filer includes a storage operating system that implements a file system to logically organize the information as a hierarchical structure of directories and files on the disks. Each "on-disk" file may be implemented as a set of disk blocks configured to store information, whereas the directory may be implemented as a specially-formatted file in which information about other files and directories are stored. A filer may be configured to operate according to a client/server model of information delivery to allow many clients to access files stored on the filer. In this model, the client may include an application, such as a file system protocol, executing on a computer that connects to the filer over a computer network. The computer network can include, for example, a point-to-point link, a shared local area network (LAN), a wide area network (WAN), or a virtual private network (VPN) implemented over a public network such as the Internet. Each client may request filer services by issuing file system protocol messages (in the form of packets) to the filer over the network.

A common type of file system is a "write in-place" file system, in which the locations of the data structures (such as inodes and data blocks) on disk are typically fixed. An inode is a data structure used to store information, such as metadata, about a file, whereas the data blocks are structures used to store the actual data for the file. The information contained in an inode may include information relating to: ownership of the file, access permissions for the file, the size of the file, the file type, and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not overwrite data on disks. If a data block on disk is read from disk into memory and "dirtied" with new data, the data block is written to a new location on the disk to optimize write performance. A write-anywhere file system may initially assume an optimal layout, such that the data is substantially contiguously arranged on the disks. The optimal disk layout results in efficient access operations, particularly for sequential read operations. A particular example of a write-anywhere file system is the Write Anywhere File Layout (WAFL®) file system available from NetApp. The WAFL file system is implemented within a microkernel as part of the overall protocol stack of the filer and associated disk storage. This microkernel is supplied as part of NetApp's Data ONTAP® storage operating system, residing on the filer, that processes file service requests from network-attached clients.

As used herein, the term "storage operating system" generally refers to the computer-executable code operable on a storage system that manages data access. The storage operating system may, in case of a filer, implement file system semantics, such as the Data ONTAP® storage operating system. The storage operating system can also be implemented as an application program operating on a general-purpose operating system, such as UNIX® or Windows®, or as a general-purpose operating system with configurable functionality, which is configured for storage applications as described herein.

Disk storage is typically implemented as one or more storage "volumes" that comprise physical storage disks, defining an overall logical arrangement of storage space. Currently available filer implementations can serve a large number of discrete volumes. Each volume is associated with its own file system and as used herein, the terms "volume" and "file system" are interchangeable.

The disks within a volume can be organized as a Redundant Array of Independent (or Inexpensive) Disks (RAID). RAID implementations enhance the reliability and integrity of data storage through the writing of data "stripes" across a given number of physical disks in the RAID group, and the appropriate storing of parity information with respect to the striped data. In the example of a WAFL® file system, a RAID 4 implementation is advantageously employed, which entails striping data across a group of disks, and storing the parity within a separate disk of the RAID group. As described herein, a volume typically comprises at least one data disk and one associated parity disk (or possibly data/parity) partitions in a single disk arranged according to a RAID 4, or equivalent high-reliability, implementation.

A filer may be configured to send status messages for remote monitoring of the filer at predetermined intervals or based on the occurrence of predetermined events. In one embodiment, from NetApp, these status messages are known as "AutoSupports". The status messages are monitored remotely and are analyzed to determine if any problems occur on the filer. An authorized storage system administrator can review the status messages and any associated analysis, to permit the administrator to self-service and monitor the filer.

A status message may be sent as an electronic mail message or as a HyperText Transfer Protocol (HTTP) message. Based on the large number of messages that can be generated by a filer and the large amount of information that can be contained in a single message, it quickly becomes difficult to navigate through all of the messages and information. There is therefore a need for a simpler way to view the status messages and information on a macro scale, to more easily view the storage system's layout and configuration, and to be able to compare the configurations of different elements of the storage system to determine whether configuration changes over time caused an error.

SUMMARY

A method and system for visually displaying and navigating a computer storage system are disclosed. The storage system can be graphically browsed to select a particular entity in the storage system. A graphical timeline of events relating to the selected entity is displayed. Selecting an event from the timeline displays a graphical representation of the storage system at a time relating to the selected event or additional graphical detail about the selected event. Based on the selected event, configuration information for the entity in the storage system that experienced the event can be displayed and compared against the configuration of the entity at a different time or against a predefined template.

BRIEF DESCRIPTION OF THE DRAWINGS

A more detailed understanding of the invention may be had from the following description of preferred embodiments, given by way of example, and to be understood in conjunction with the accompanying drawings, wherein:

FIG. 8 is a diagram of an exemplary screen showing a list of entities in the storage system;

FIG. 10 is a diagram of an exemplary screen showing an event detail listing;

FIG. 13 is a diagram of an exemplary screen showing a graphical disk level view of the storage system;

FIG. 19 is a diagram of an exemplary screen showing a storage system configuration template creation and comparison.

DETAILED DESCRIPTION OF THE PREFERRED EMBODIMENTS

The present invention describes a method and system for visually displaying and navigating a computer storage system. The storage system can be graphically browsed to select a particular entity in the storage system. A graphical timeline of events relating to the selected entity is displayed. Selecting an event from the timeline displays a graphical representation of the storage system at a time relating to the selected event or additional graphical detail about the selected event. Based on the selected event, configuration information for the entity in the storage system that experienced the event can be displayed. The configuration information can be compared against the configuration of the entity at a different time or against a predefined template.

Network Environment

Figure 1:
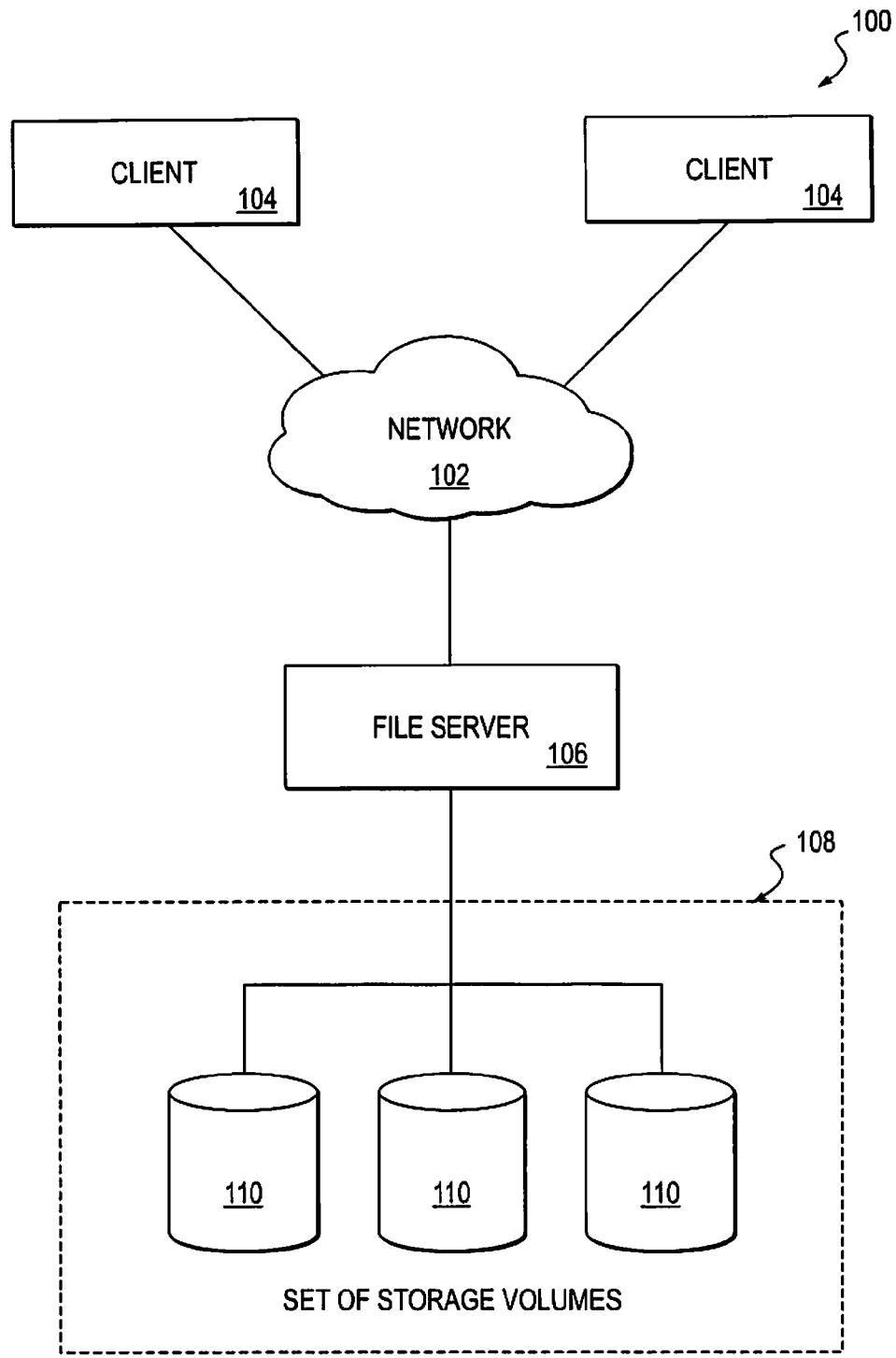
FIG. 1 is a block diagram of a network environment in which the present invention can be implemented.

FIG. 1 is a block diagram of an exemplary network environment 100 in which the principles of the present invention are implemented. The environment 100 is based around a network 102. The network 102 can be a local area network (LAN), a wide area network (WAN), a virtual private network (VPN) using communication links over the Internet, for example, or any combination of the three network types. For the purposes of this description, the term "network" includes any acceptable network architecture.

The network 102 interconnects a number of clients 104 and a file server 106. The file server 106, a storage server that is not limited to only storing files, described further below, is configured to control storage of data and access to data that is located on a set 108 of interconnected storage volumes or disks 110. In one embodiment, the storage server can include a network module (N-module) and a data module (D-module) which are logical modules that manage communication and data storage, respectively (not shown). It is noted that the terms "storage volumes" and "disks" can be used interchangeably herein, without limiting the term "storage volumes" to disks. The term "storage volumes" can include any type of storage media, such as tapes or non-volatile memory.

In one embodiment, multiple storage systems can be arranged in a cluster configuration to form a single file server system. Such a clustered file server system has a distributed architecture that includes a plurality of server nodes interconnected by a switching fabric (not shown). Each server node typically includes a network module (an N-module), a disk module (a D-module), and an management module (M-host). The N-module provides functionality that enables a respective node within the clustered system to connect to a client system over a computer network, the D-module provides functionality enabling the respective node to connect to one or more disks, and the M-host provides management functions for the clustered system. A switched virtualization layer is provided below the interface between the N-module and the client system(s), allowing the disks associated with the multiple nodes in the cluster configuration to be presented to the client system(s) as a single shared storage pool.

The clustered file server system with the distributed architecture has a number advantages over the traditional filer with the monolithic architecture. For example, the clustered file server system provides horizontal scalability, allowing one or more server nodes to be added to the clustered system as the number of client systems connected to the network increases. Further, the clustered system allows for the migration of the volume data among the multiple server nodes, and provides load sharing for mirrors of volumes. Moreover, in the clustered system, the names of volumes from the multiple server nodes can be linked into a virtual global hierarchical namespace, allowing the client systems to mount the volumes from the various server nodes with increased flexibility. In addition, in the clustered system, if one of the server nodes fails, then another one of the server nodes can assume the tasks of processing and handling any data requests normally processed by the node that failed, thereby providing an effective failover mechanism.

Each of the devices attached to the network 102 includes an appropriate conventional network interface connection (not shown) for communicating over the network 102 using a communication protocol, such as Transport Control Protocol/Internet Protocol (TCP/IP), User Datagram Protocol (UDP), Hyper Text Transfer Protocol (HTTP), Simple Network Management Protocol (SNMP), or Virtual Interface (VI) connections.

File Server

Figure 2:
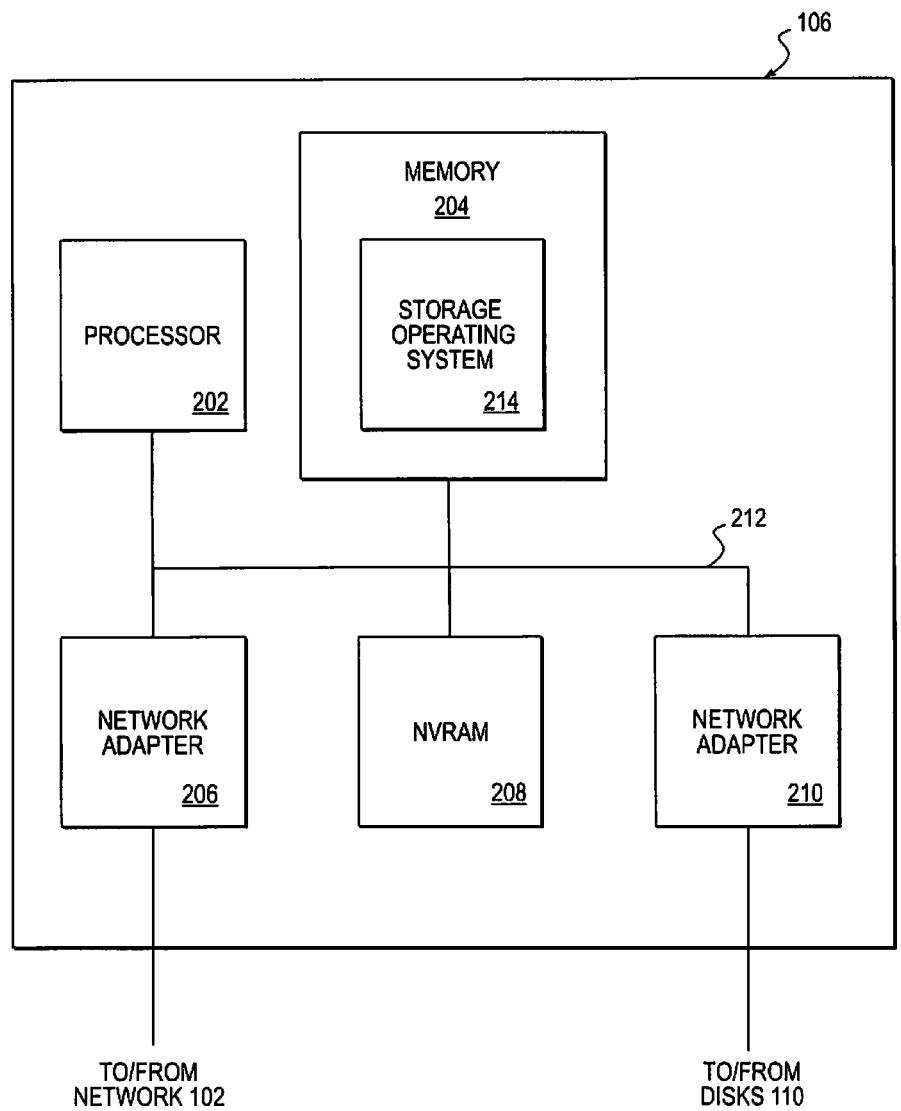
FIG. 2 is a block diagram of the file server shown in FIG. 1.

FIG. 2 is a detailed block diagram of an exemplary file server ("filer") 106. It will be understood by one skilled in the art that the inventive concepts described herein apply to any type of file server, wherever implemented, including on a special-purpose computer, a general-purpose computer, or a standalone computer.

The file server 106 includes a processor 202, a memory 204, a network adapter 206, a nonvolatile random access memory (NVRAM) 208, and a storage adapter 210, all of which are interconnected by a system bus 212. Contained within the memory 204 is a storage operating system 214 that implements a file system to logically organize the information as a hierarchical structure of directories and files on the disks 110. In an exemplary embodiment, the memory 204 is addressable by the processor 202 and the adapters 206, 210 for storing software program code. The operating system 214, portions of which are typically resident in the memory 204 and executed by the processing elements, functionally organizes the filer by invoking storage operations in support of a file service implemented by the filer.

The network adapter 206 includes mechanical, electrical, and signaling circuitry needed to connect the filer 106 to clients 104 over the network 102. The clients 104 may be general-purpose computers configured to execute applications, such as database applications. Moreover, the clients 104 may interact with the filer 106 in accordance with a client/server information delivery model. That is, the client 104 requests the services of the filer 106, and the filer 106 returns the results of the services requested by the client 104 by exchanging packets defined by an appropriate networking protocol.

The storage adapter 210 interoperates with the storage operating system 214 and the disks 110 of the set of storage volumes 108 to access information requested by the client 104. The storage adapter 210 includes input/output (I/O) interface circuitry that couples to the disks 110 over an I/O interconnect arrangement, such as a Fibre Channel link. The information is retrieved by the storage adapter 210 and, if necessary, is processed by the processor 202 (or the adapter 210 itself) prior to being forwarded over the system bus 212 to the network adapter 206, where the information is formatted into appropriate packets and returned to the client 104.

In one exemplary implementation, the filer 106 includes a non-volatile random access memory (NVRAM) 208 that provides fault-tolerant backup of data, enabling the integrity of filer transactions to survive a service interruption based upon a power failure or other fault.

Storage Operating System

To facilitate the generalized access to the disks 110, the storage operating system 214 implements a write-anywhere file system that logically organizes the information as a hierarchical structure of directories and files on the disks. As noted above, in an exemplary embodiment described herein, the storage operating system 214 is the NetApp® Data ONTAP® operating system available from NetApp, that implements the WAFL® file system. It is noted that any other appropriate file system can be used, and as such, where the terms "WAFL®" or "file system" are used, those terms should be interpreted broadly to refer to any file system that is adaptable to the teachings of this invention.

Figure 3:
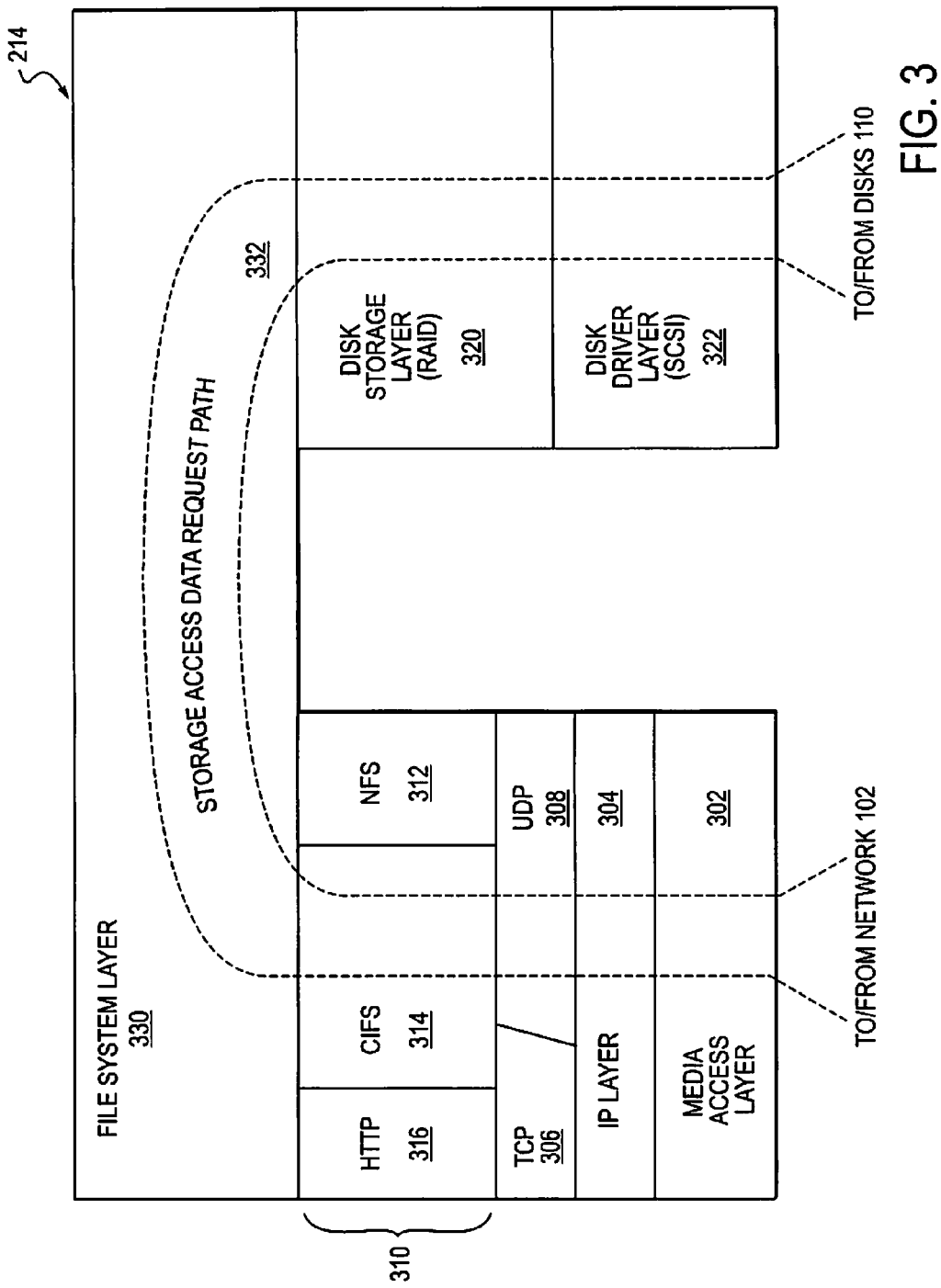
FIG. 3 is a block diagram of the storage operating system shown in FIG. 2.

Referring now to FIG. 3, the storage operating system 214 consists of a series of software layers, including a media access layer 302 of network drivers (e.g., an Ethernet driver). The storage operating system 214 further includes network protocol layers, such as an Internet Protocol (IP) layer 304 and its supporting transport mechanisms, a Transport Control Protocol (TCP) layer 306 and a User Datagram Protocol (UDP) layer 308.

A file system protocol layer 310 provides multi-protocol data access and includes support for the Network File System (NFS) protocol 312, the Common Internet File System (CIFS) protocol 314, and the Hyper Text Transfer Protocol (HTTP) 316. In addition, the storage operating system 214 includes a disk storage layer 320 that implements a disk storage protocol, such as a redundant array of independent disks (RAID) protocol, and a disk driver layer 322 that implements a disk access protocol such as, e.g., a Small Computer System Interface (SCSI) protocol.

Bridging the disk software layers 320-322 with the network and file system protocol layers 302-316 is a file system layer 330. Generally, the file system layer 330 implements a file system having an on-disk format representation that is block-based using data blocks and inodes to describe the files.

In the storage operating system 214, a data request path 332 between the network 102 and the disk 110 through the various layers of the operating system is followed. In response to a transaction request, the file system layer 330 generates an operation to retrieve the requested data from the disks 110 if the data is not resident in the filer's memory 204. If the data is not in the memory 204, then the file system layer 330 indexes into an inode file using the inode number to access an appropriate entry and retrieve a logical volume block number. The file system layer 330 then passes the logical volume block number to the disk storage layer 320. The disk storage layer 320 maps the logical number to a disk block number and sends the disk block number to an appropriate driver (for example, an encapsulation of SCSI implemented on a Fibre Channel disk interconnection) in the disk driver layer 322. The disk driver accesses the disk block number on the disks 110 and loads the requested data in the memory 204 for processing by the filer 106. Upon completing the request, the filer 106 (and storage operating system 214) returns a reply, e.g., an acknowledgement packet defined by the CIFS specification, to the client 104 over the network 102.

It is noted that the storage access request data path 332 through the storage operating system layers described above may be implemented in hardware, software, or a combination of hardware and software. In an alternate embodiment of this invention, the storage access request data path 332 may be implemented as logic circuitry embodied within a field programmable gate array (FPGA) or in an application specific integrated circuit (ASIC). This type of hardware implementation increases the performance of the file services provided by the filer 106 in response to a file system request issued by a client 104.

System Construction

Figure 4:
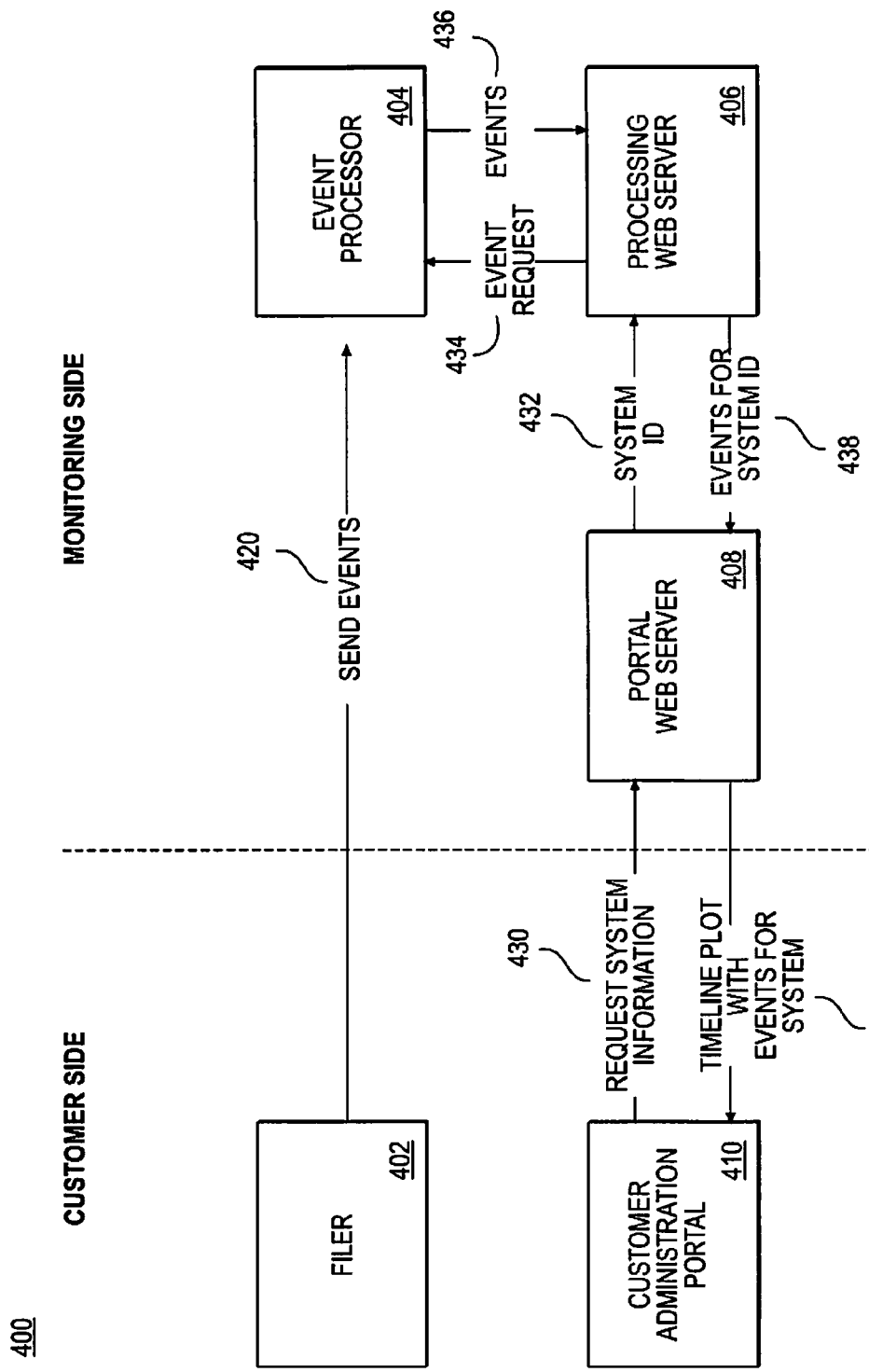
FIG. 4 is a block diagram of a storage system configured to display a timeline of events.

FIG. 4 is a block diagram of a storage system 400 configured to graphically browse the storage system, to graphically view events that occur in the storage system, and to view the storage system's configuration. The system 400 includes a filer 402, an event processor 404, a processing World Wide Web (hereinafter "Web") server 406, a portal Web server 408, and a customer administration portal 410. It is noted that while only one filer is shown in FIG. 4, the system 400 will operate in a similar manner regardless of the number of filers in the system. The designations "customer side" and "monitoring side" shown in FIG. 4 are exemplary; the elements on the monitoring side may be located remote from the customer side.

In general, the system 400 operates as follows; additional details of particular aspects of the operation will be discussed below. The filer 402 sends events 420 to the event processor 404. The events can include, but are not limited to, a disk failure, a low battery condition, a configuration error, a low disk throughput, a high operating temperature reached, or a reboot. The events 420 are stored by the event processor 404.

A storage system administrator, via the administration portal 410 (which may include, for example, a computer with an Internet connection), requests system information 430 from the portal Web server 408. The administrator browses for a particular system and/or entity within a system, and a system identifier (ID) 432 corresponding to the selected system or entity is sent from the portal Web server 408 to the processing Web server 406. The processing Web server 406 submits an event request 434 to the event processor 404 for all events associated with the system ID 432.

The event processor 404 returns the events 436 associated with the system ID 432 to the processing Web server 406. The events 438 for the system ID 432 are passed from the processing Web server to the portal Web server 408, which generates a timeline plot 440 with the events for the selected system or entity that can be viewed by the administrator via the administration portal 410.

Overview of System Operation

Figure 5:
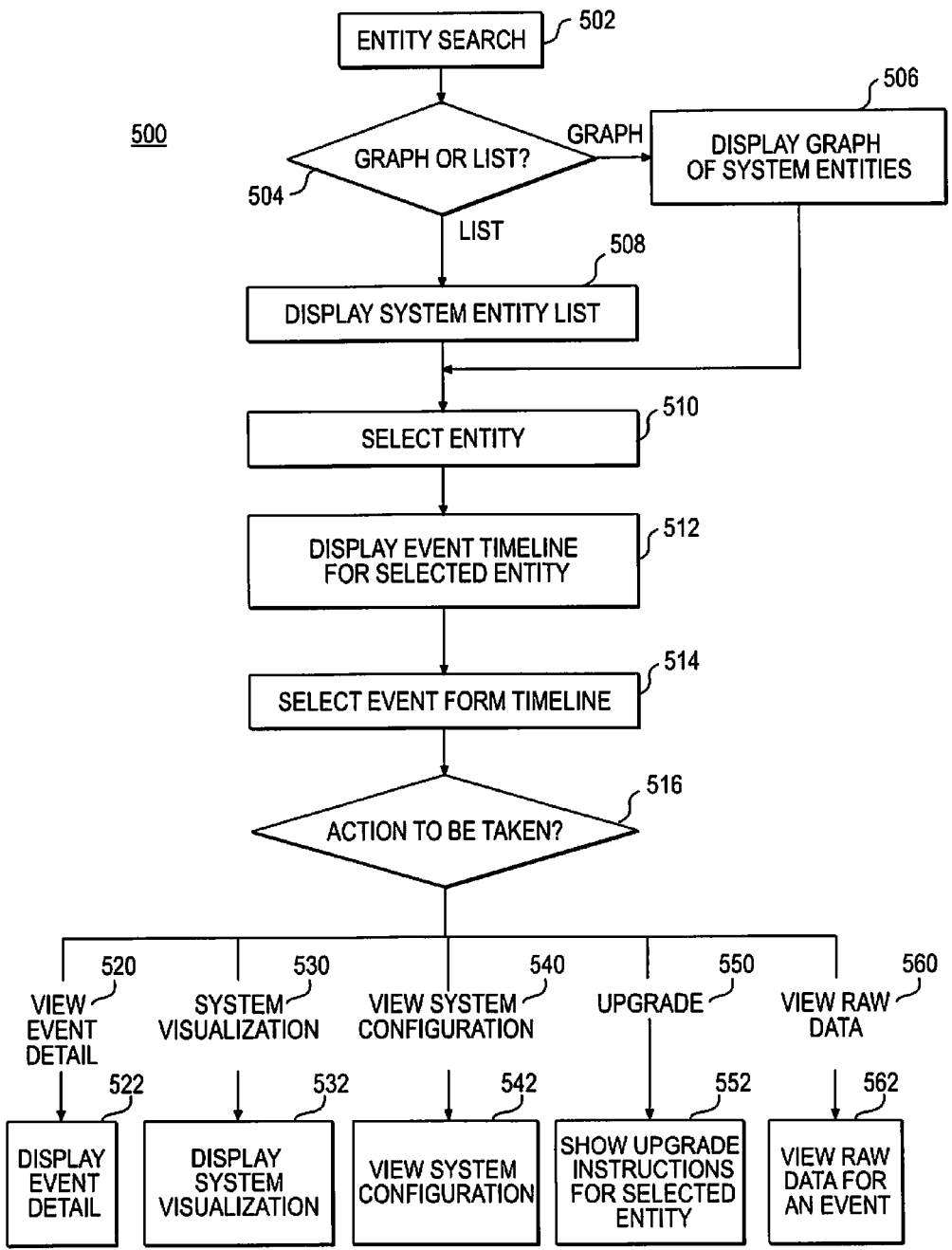
FIG. 5 is a flowchart of a method of operation of a storage system configured to graphically display the system components.

FIG. 5 is a flowchart of a method 500 of operation of a storage system configured to graphically display the system components, to view a timeline of system events, to view the configuration of the system, to view instructions on how to upgrade the system, and to view raw data about a system event. The method 500 begins with a storage system administrator performing an entity search (step 502). Once the administrator selects an entity, all of the components of the selected entity can be viewed in graphical form or list form (step 504). If the administrator elects to view the selected entity's components in graphical form, then a graph of the system entities is displayed (step 506). If the administrator elects to view the selected entity's components in list form, then a text list of the system entities is displayed (step 508).

After the system entities have been displayed, either in graphical form (step 506) or in list form (step 508), the administrator can select a specific entity (step 510) and repeatedly drill down to lower layers of the storage system, down to the individual disk level. Once the administrator has selected a specific entity, an event timeline for the selected entity is displayed (step 512).

The administrator can select an event from the timeline (step 514) and perform a further action based on the selected event. The actions include: viewing details of the selected event (steps 520 and 522), viewing a graphical representation of the system at the time of the selected event (steps 530 and 532), viewing system configurations based on the time of the selected event (steps 540 and 542), viewing upgrade instructions for upgrading the system based on an operating system (OS) version running at the time of the selected event (steps 550 and 552), and viewing raw data for an event (steps 560 and 562). The actions are described in further detail below.

Searching for System Entities

Figure 6:
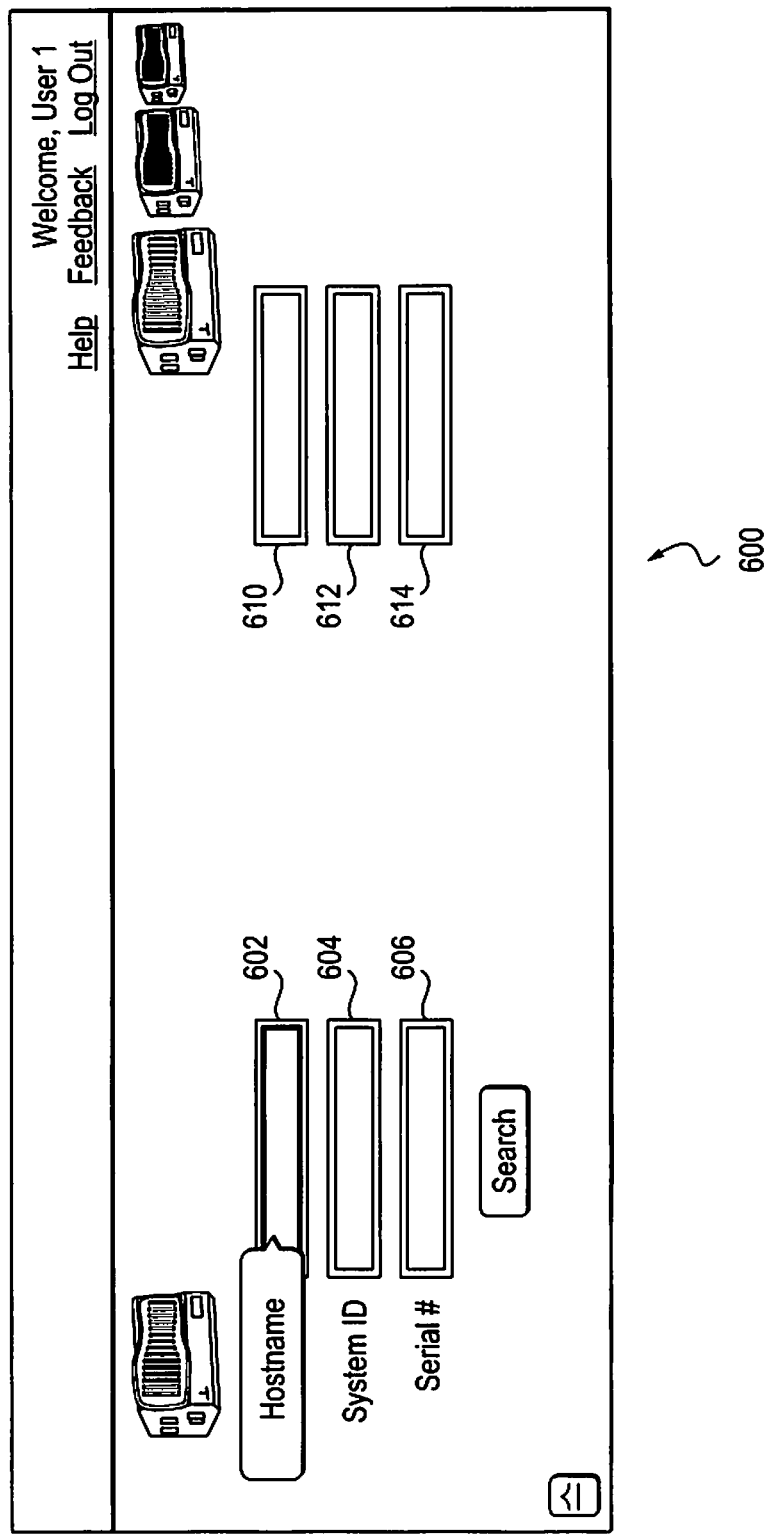
FIG. 6 is a diagram of an exemplary search screen used to search for an entity in a storage system.

FIG. 6 is a diagram of an exemplary search screen 600 used to search for an entity in a storage system. If the administrator knows information about a particular entity that they wish to search for, such as a hostname 602, a system ID 604, or a serial number 606 of the entity, that information can be entered and the administrator can quickly view details about the specific entity. Alternatively, if the administrator has multiple entities in their storage system, the system can be browsed by customer name 610, group identifier 612, or site identifier 614. It is noted that the search criteria shown in FIG. 6 is exemplary and that one skilled in the art can identify additional search criteria by which an administrator can search or browse for entities in their storage system.

Graphically Browsing the System

Figure 7:
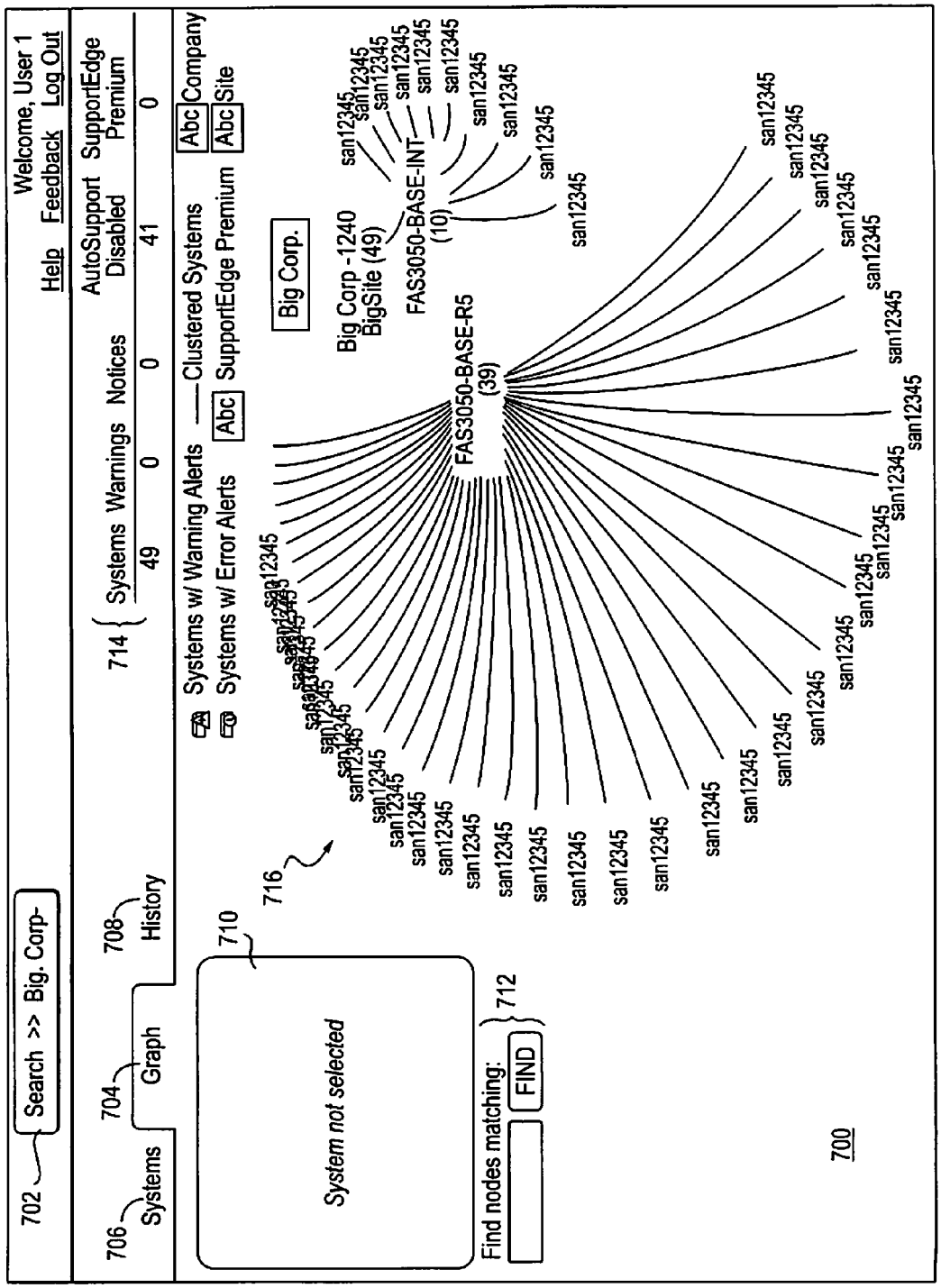
FIG. 7 is a diagram of an exemplary screen showing a graph of storage system entities.

FIG. 7 is a diagram of an exemplary screen 700 showing a graph of system entities. The screen 700 includes location information 702 (i.e., a "breadcrumb trail") indicating where in the system hierarchy the administrator is currently viewing. The administrator can view the system as a graph by selecting a graph tab 704 or as a list by selecting a systems tab 706. The administrator may also view a history of previous systems and entities viewed by selecting a history tab 708. If a specific system is selected, details regarding the selected system are displayed in box 710. The administrator may also search for specific nodes in the system via search box 712. A summary of system information is shown in a status bar 714. A real-time graph 716 of the system is shown.

The graph 716 is constructed in real-time based on the state of the system at the time the graph is drawn. The graph 716 is navigable in that the administrator can select a displayed element or "click and drag" a displayed element to browse deeper into the system hierarchy to view additional system details. The graph 716 is generated dynamically by a graphing package based on information about the system that is stored in a database. To navigate through the graph, each point is provided with a uniform resource identifier, such that the administrator can click and drag a point on the graph to manipulate the graph. In one implementation, additional details regarding a point on the graph can be obtained by "hovering" the cursor over that point and a pop-up window appears displaying the additional details.

It is noted that the information shown on the screen 700 is exemplary and that one skilled in the art can create different arrangements of the elements.

FIG. 8 is a diagram of an exemplary screen 800 showing a system entity list. The screen 800 includes location information 802 (i.e., a "breadcrumb trail") indicating where in the system hierarchy the administrator is currently viewing. The administrator can view the system as a list by selecting a systems tab 804 or as a graph by selecting a graph tab 806 (this view is described in connection with FIG. 7). The administrator may also view a history of previous systems and entities viewed by selecting a history tab 808. A summary of system information is shown in a status bar 810. A list 812 of entities in the system is shown and the administrator can select an entity from the list 812 to browse deeper into the system hierarchy to view additional system details. It is noted that the information shown on the screen 800 is exemplary and that one skilled in the art can create different arrangements of the elements.

Graphical Timeline Representation of Events

Figure 9:
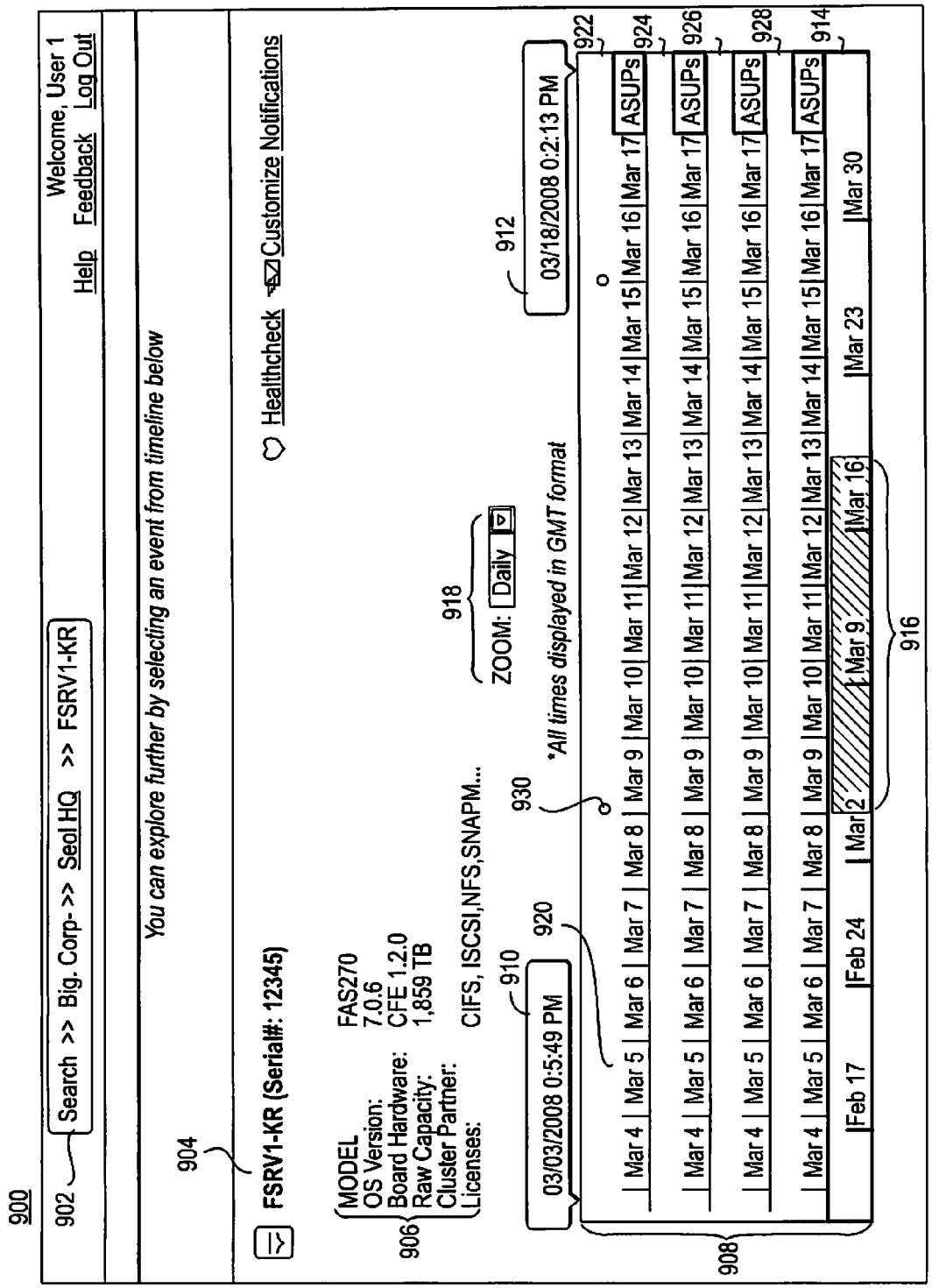
FIG. 9 is a diagram of an exemplary screen showing a graphical event timeline.

FIG. 9 is a diagram of an exemplary screen 900 showing a graphical event timeline. The screen 900 includes location information 902 (i.e., a "breadcrumb trail") indicating where in the system hierarchy the administrator is currently viewing. The screen 900 shows events relating to a selected storage system entity and includes identifying information 904 for the entity, configuration information 906 for the entity, and a timeline 908 of events relating to the entity. The identifying information 904 includes, for example, the entity name and serial number. The configuration information 906 includes information such as the model number, the operating system (OS) version that is currently running on the entity, a hardware identifier, the storage capacity, other entities in a related group (e.g., a cluster), and applicable licenses. It is noted that additional or different identifying information 906 may be displayed without altering the operation of the invention.

The timeline 908 is generated by accessing a database of all events related to the selected entity. The events are plotted along the timeline 908 based on the date that the event occurred. For each date on which an event occurred, a graphical indicator (shown as a dot in FIG. 9) is placed on the timeline 908 on the date to indicate that an event occurred on that date.

The timeline 908 identifies a starting point 910 and an ending point 912 for the displayed portion of the timeline 908. A weekly scale 914 includes a slider 916 that is highlighted to indicate the time range currently displayed in the timeline 908. The slider 916 can be dragged along the scale 914 to quickly move to different points in time. It is possible to change the granularity of the timeline 908 by selecting a different view (or "zoom") level 918. It is noted that the granularity of the timeline 908 and the scale 914 can be changed without affecting the operation of the invention. The remainder of the description of the screen 900 assumes that a daily view is used.

The main portion of the timeline 908 includes a plurality of boxes 920, one box 920 for each day. The timeline 908 includes a plurality of rows, one row for each type of event that is logged. The types of events that are logged include general events (in one embodiment, referred to as AutoSupports or ASUPs) 922, cases that have been opened for further review based on events (also referred to as "cases") 924, failure events 926, and alerts 928. It is noted that the rows 922-928 shown in FIG. 9 are exemplary and that, generally, different types of events may be indicated on different rows such that the number of rows of the timeline 908 may vary depending on the implementation.

A dot 930 within a box 920 indicates that one or more events occurred on the day identified by the box 920 and the corresponding row 922-928 where the box 920 is located. In one embodiment, each dot 930 represents an eight hour time block. A number next to the dot 930 (not shown in FIG. 9) indicates the number of events of that type that have been logged within the time block, with no number indicating that only one event of that type has been logged within the time block. Multiple dots within a box 920 indicate that events occurred in different time blocks. It is noted that the described eight hour time block is merely exemplary and that one skilled in the art could implement different length time blocks without affecting the operation of the invention.

Different colored dots 930 can be used to differentiate between different types of events. For example, a green dot can indicate a weekly general event log and a blue dot can indicate a failure event, an alert, or a case. From the timeline 908, an administrator can select one of the dots 930 for further interaction with the system, as will be described in connection with FIGS. 10-15.

It is noted that the information shown on the screen 900 is exemplary and that one skilled in the art can create different arrangements of the elements. Visually differentiating between the types of events can be achieved by means other than different colors or using indicators other than dots.

Viewing Individual Events

FIG. 10 is a diagram of an exemplary screen 1000 showing an event detail listing for a single time block. When the administrator selects one of the event dots that indicates more than one event (930 in FIG. 9), screen 1000 is displayed and includes a list of events 1002 from a single category, as defined by the selected dot. Selecting a single event 1002 displays additional details regarding the selected event, as described in connection with FIGS. 11-15. Screens similar to screen 1000 can be used to display lists of all types of events as described above, including cases, failure events, and alerts. It is noted that the information shown on the screen 1000 is exemplary and that one skilled in the art can create different arrangements of the elements.

Graphical System Visualizations

Figure 11:
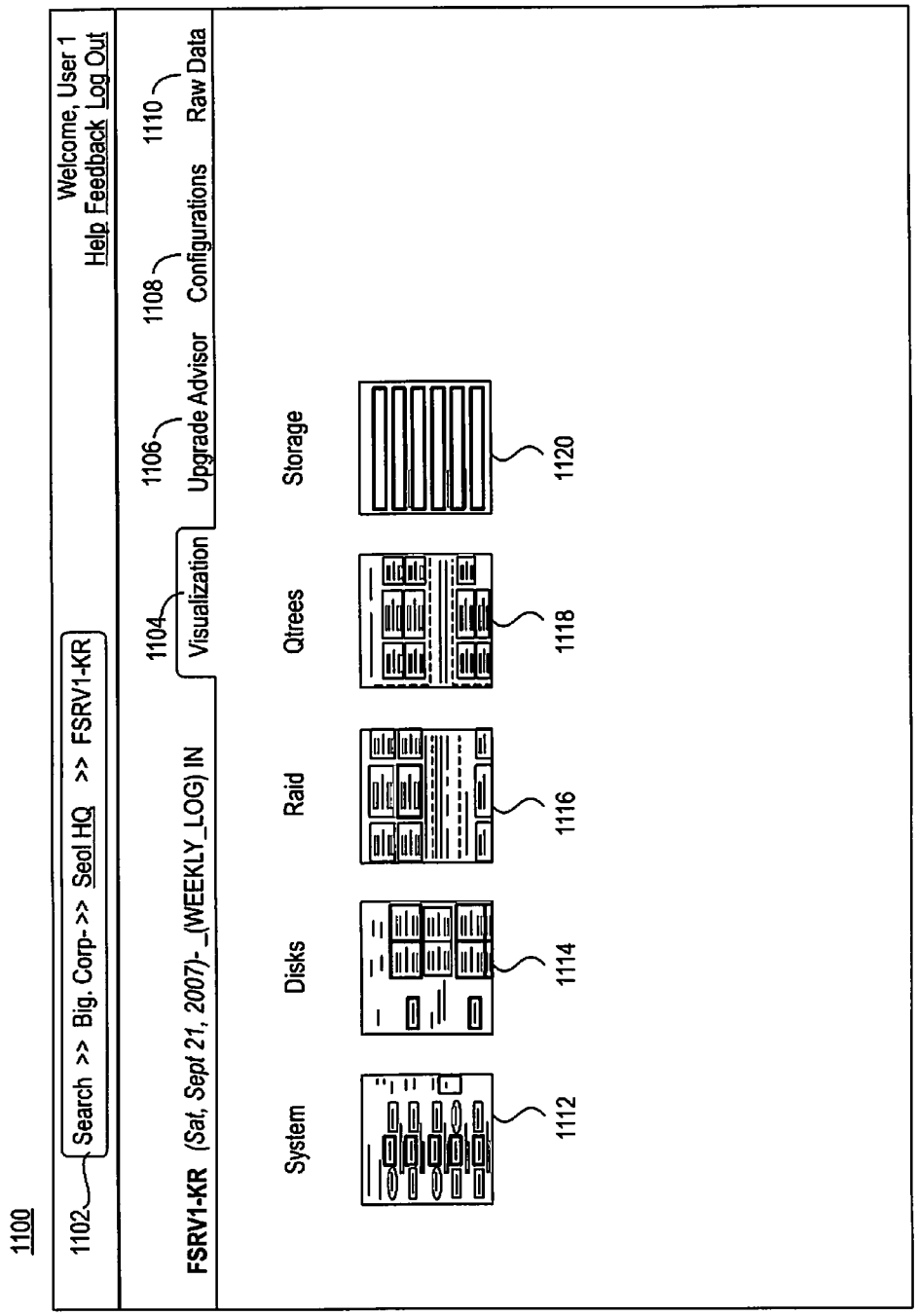
FIG. 11 is a diagram of an exemplary screen showing different possible graphical views of the storage system.

Selecting one of the dots 930 (from FIG. 9), if there is only one event associated with the dot, or selecting one of the events 1002 (from FIG. 10) allows the administrator to see a graphical representation of the system. FIG. 11 is a diagram of an exemplary screen 1100 showing an overview of the different possible graphical views of the storage system. The screen 1100 includes location information 1102 (i.e., a "breadcrumb trail") indicating where in the system hierarchy the administrator is currently viewing. The administrator can navigate via various tabs, including a visualization tab 1104, an upgrade advisor tab 1106, a configurations tab 1108, and a raw data tab 1110.

The initial view via the visualization tab 1104 presents several thumbnail drawings of different possible visualizations of the selected system. The visualization presented is a visualization of the entire storage system. The possible visualizations include a system view 1112, a disk level view 1114, a RAID level view 1116, a logical level view 1118, and a storage view 1120. It is noted that the views 1112-1120 are exemplary and that one skilled in the art could utilize more or fewer views.

Figure 12:
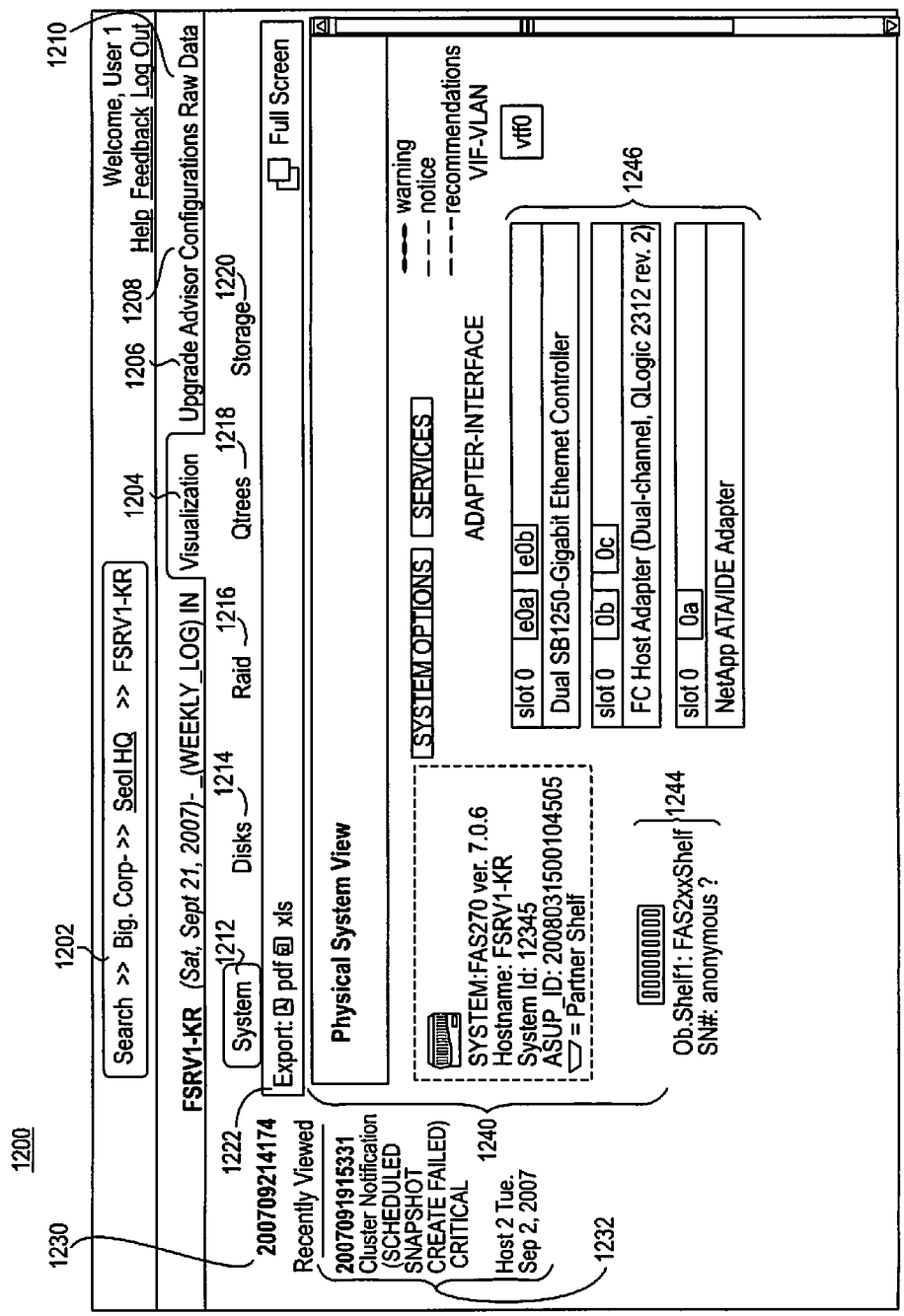
FIG. 12 is a diagram of an exemplary screen showing a graphical physical view of the storage system.

FIG. 12 is a diagram of an exemplary screen 1200 showing a graphical physical view of the storage system. The screen 1200 includes location information 1202 (i.e., a "breadcrumb trail") indicating where in the system hierarchy the administrator is currently viewing. The administrator can navigate via various tabs, including a visualization tab 1204, an upgrade advisor tab 1206, a configurations tab 1208, and a raw data tab 1210. The administrator can select from various possible graphical system views, including a system view 1212, a disk level view 1214, a RAID level view 1216, a logical level view 1218, and a storage view 1220. It is possible to export the physical system view information shown on the screen 1200 via an export option 1222.

The screen 1200 includes an event identifier 1230 that corresponds to the currently selected event and a list 1232 of recent viewed events. A system view 1240 is related to the currently selected event 1230, in that the system view 1240 shown is a real-time generation of the system status based on the time of the selected event 1230.

The system view 1240 includes information 1242 about the system and information 1244 about the shelves that are part of the system. A list 1246 of adapters that are in the system are shown, along with identifying information about each adapter. In one embodiment, certain elements of the screen 1200 are interactive, in that if an administrator "hovers" the cursor over an element, additional information is displayed about that element in a pop-up window. Within the pop-up window, further additional information may be accessed, depending on the information available for that element. In one implementation, the further additional information includes warnings and/or notices for the selected element. It is noted that the information shown on the screen 1200 is exemplary and that one skilled in the art can create different arrangements of the elements.

Figure 13:
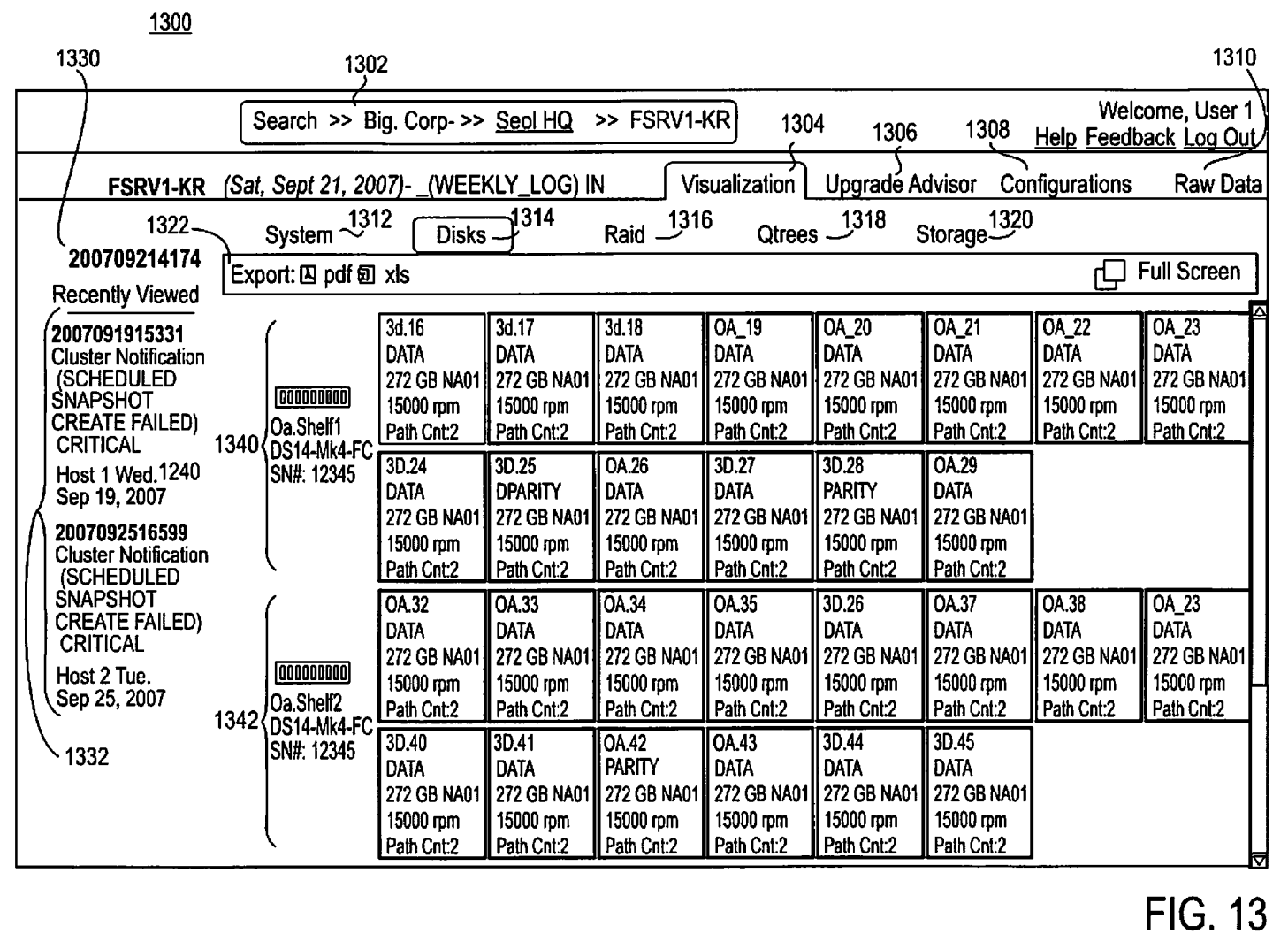

FIG. 13 is a diagram of an exemplary screen 1300 showing a graphical disk level view of the storage system. The screen 1300 includes location information 1302 (i.e., a "breadcrumb trail") indicating where in the system hierarchy the administrator is currently viewing. The administrator can navigate via various tabs, including a visualization tab 1304, an upgrade advisor tab 1306, a configurations tab 1308, and a raw data tab 1310. The administrator can select from various possible graphical system views, including a system view 1312, a disk level view 1314, a RAID level view 1316, a logical level view 1318, and a storage view 1320. It is possible to export the disk level system view information shown on the screen 1300 via an export option 1322. The screen 1300 includes an event identifier 1330 that corresponds to the currently selected event and a list 1332 of recent viewed events.

Information about each shelf in the system is shown at the time of the selected event 1330, including shelves 1340 and 1342. It is noted that while only two shelves are shown in the screen 1300, whatever number of shelves are present in the system will be shown in the screen 1300. The information shown about each shelf 1340, 1342 includes identifying information about the shelf, such as a shelf name and serial number. Information is also shown about each disk 1350 in the shelf. The disk-related information includes, for example, the disk name, an indication whether the disk is serving as a data disk or a parity disk, the size of the disk, the speed of the disk, and the path to the disk. Additional information about the disk 1350 may be shown.

In one embodiment, certain elements of the screen 1300 are interactive, in that if an administrator "hovers" the cursor over an element, additional information is displayed about that element in a pop-up window. Within the pop-up window, further additional information may be accessed, depending on the information available for that element. In one implementation, the further additional information includes warnings and/or notices for the selected element. It is noted that the information shown on the screen 1300 is exemplary and that one skilled in the art can create different arrangements of the elements.

Figure 14:
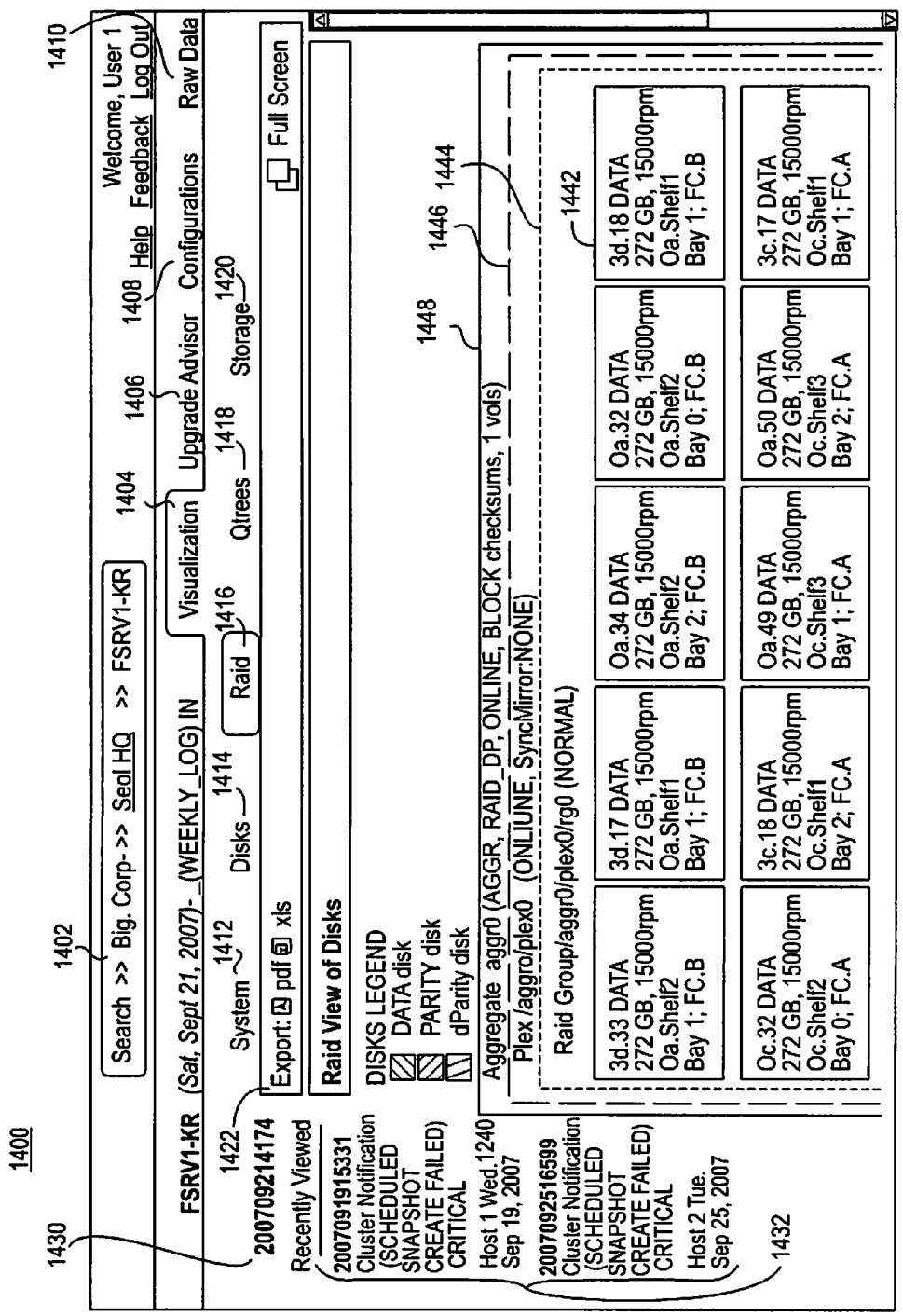
FIG. 14 is a diagram of an exemplary screen showing a graphical RAID level view of the storage system.

FIG. 14 is a diagram of an exemplary screen 1400 showing a graphical RAID level view of the storage system. The screen 1400 includes location information 1402 (i.e., a "breadcrumb trail") indicating where in the system hierarchy the administrator is currently viewing. The administrator can navigate via various tabs, including a visualization tab 1404, an upgrade advisor tab 1406, a configurations tab 1408, and a raw data tab 1410. The administrator can select from various possible graphical system views, including a system view 1412, a disk level view 1414, a RAID level view 1416, a logical level view 1418, and a storage view 1420. It is possible to export the RAID level system view information shown on the screen 1400 via an export option 1422. The screen 1400 includes an event identifier 1430 that corresponds to the currently selected event and a list 1432 of recent viewed events.

The RAID view 1440 includes information about each disk 1442 in the system at the time of the selected event 1430. The information includes, for example, the disk name, an indication whether the disk is serving as a data disk or a parity disk, the size of the disk, the speed of the disk, the location of the disk, and how the disk is connected. Additional information about the disk 1442 may be shown. The RAID level view 1440 indicates how the disks 1442 are grouped at the RAID group level 1444, at the Plex level 1446 (consisting of multiple RAID groups), and at the Aggregate level 1448 (consisting of multiple Plexes).

In one embodiment, certain elements of the screen 1400 are interactive, in that if an administrator "hovers" the cursor over an element, additional information is displayed about that element in a pop-up window. Within the pop-up window, further additional information may be accessed, depending on the information available for that element. In one implementation, the further additional information includes warnings and/or notices for the selected element. It is noted that the information shown on the screen 1400 is exemplary and that one skilled in the art can create different arrangements of the elements.

Figure 15:
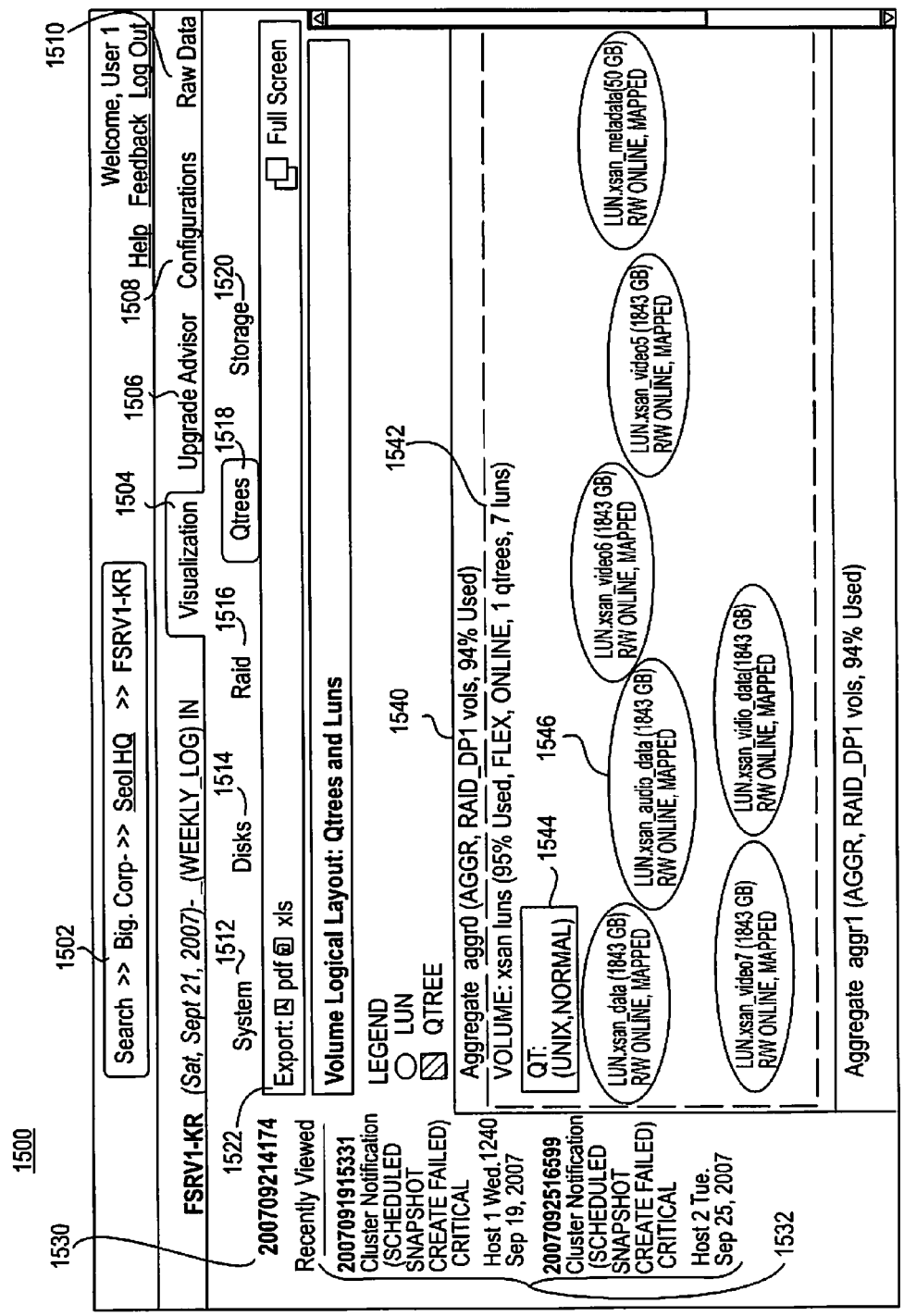
FIG. 15 is a diagram of an exemplary screen showing a graphical logical level view of the storage system.

FIG. 15 is a diagram of an exemplary screen 1500 showing a graphical logical level view of the storage system. The screen 1500 includes location information 1502 (i.e., a "breadcrumb trail") indicating where in the system hierarchy the administrator is currently viewing. The administrator can navigate via various tabs, including a visualization tab 1504, an upgrade advisor tab 1506, a configurations tab 1508, and a raw data tab 1510. The administrator can select from various possible graphical system views, including a system view 1512, a disk level view 1514, a RAID level view 1516, a logical level view 1518, and a storage view 1520. It is possible to export the logical level system view information shown on the screen 1500 via an export option 1522. The screen 1500 includes an event identifier 1530 that corresponds to the currently selected event and a list 1532 of recent viewed events.

The logical layout view includes showing aggregates 1540 in the system at the time of the selected event 1530, including information such as the aggregate name, how the aggregate is formatted, the number of volumes in the aggregate, and the percentage of storage space used. Under the aggregate 1540, each volume 1542 is shown and includes information such as the name of the volume, the percentage of the storage space used, and the numbers of Qtrees (a substructure of a logical volume, such as a sub-tree in a logical tree structure) and LUNs (logical unit numbers) in the volume. Additional information about the aggregate 1540 and the volume 1542 may also be shown. It is noted that while one aggregate and one volume are shown, the number of aggregates and volume shown will match the number of aggregates and volumes present in the system. Also shown is information about each QTree 1544 and each LUN 1546 in the volume 1542.

In one embodiment, certain elements of the screen 1500 are interactive, in that if an administrator "hovers" the cursor over an element, additional information is displayed about that element in a pop-up window. Within the pop-up window, further additional information may be accessed, depending on the information available for that element. In one implementation, the further additional information includes warnings and/or notices for the selected element. It is noted that the information shown on the screen 1500 is exemplary and that one skilled in the art can create different arrangements of the elements. It is also noted that the terms used to describe the logical layout hierarchy may vary and that the terms "QTree" and "LUN" are exemplary.

Figure 16:
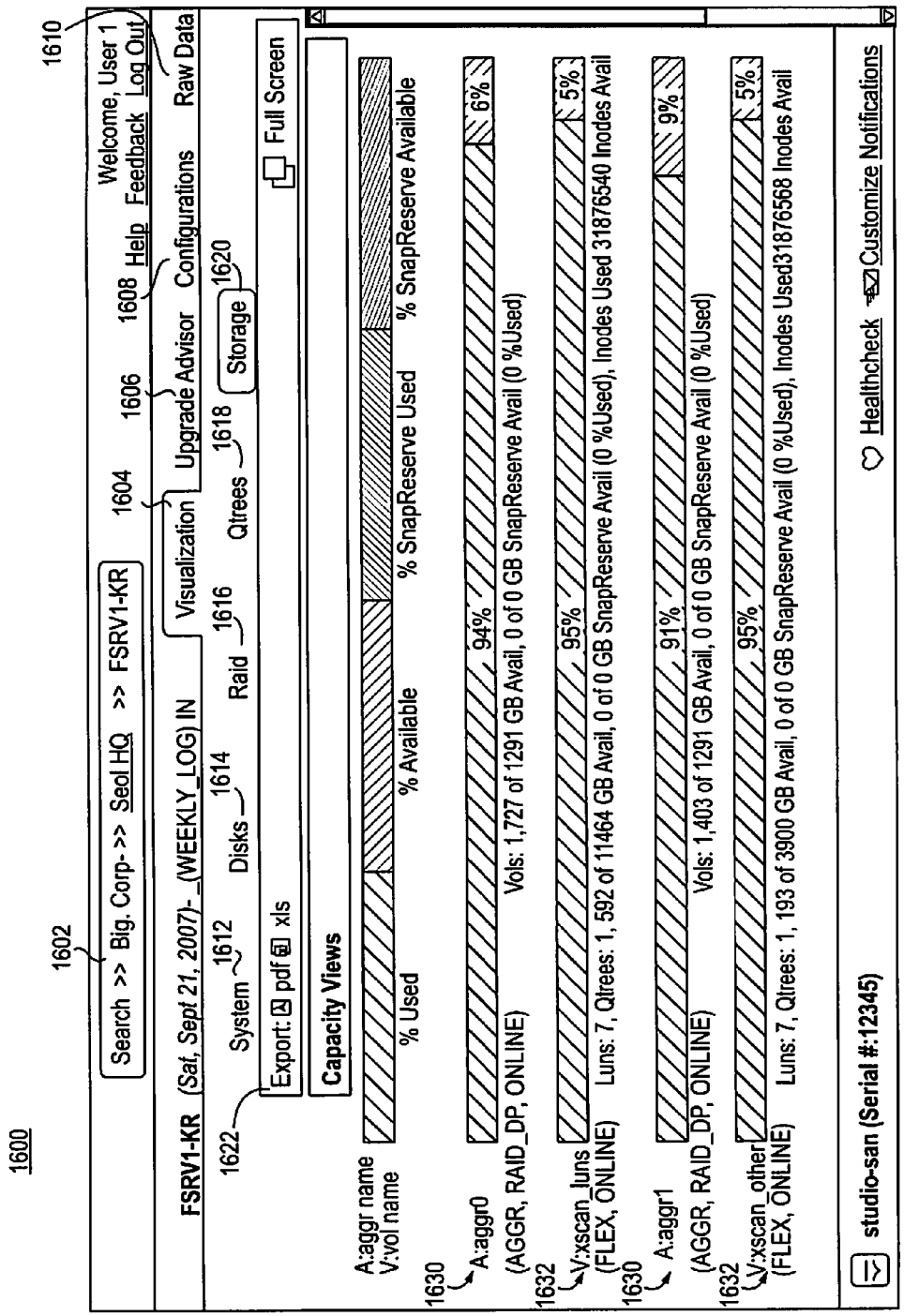
FIG. 16 is a diagram of an exemplary screen showing a storage capacity view of the storage system.

FIG. 16 is a diagram of an exemplary screen 1600 showing a storage capacity view of the storage system. The screen 1600 includes location information 1602 (i.e., a "breadcrumb trail") indicating where in the system hierarchy the administrator is currently viewing. The administrator can navigate via various tabs, including a visualization tab 1604, an upgrade advisor tab 1606, a configurations tab 1608, and a raw data tab 1610. The administrator can select from various possible graphical system views, including a system view 1612, a disk level view 1614, a RAID level view 1616, a logical level view 1618, and a storage view 1620. It is possible to export the logical level system view information shown on the screen 1600 via an export option 1622.

The storage view includes information relating to the percentage of storage space available for each aggregate 1630 in the storage system and for each volume 1632 in an aggregate 1630. The available space information includes, but is not limited to, a percentage of the space used, a percentage of the space that is available, a percentage of space for snapshot copies (shown in FIG. 16 as "SnapReserve" in one implementation) that is used, and a percentage of space for snapshot copies that is available. The storage view can also provide additional information about an aggregate 1630, such as a number of volumes in the aggregate. Additional information about a volume 1632 can also be provided, such as the number of LUNs in the volume, the number of Qtrees in the volume, the percentage of inodes used, and the number of available inodes. It is noted that the information shown on the screen 1600 is exemplary and that one skilled in the art can create different arrangements of the elements.

Viewing System Upgrade Instructions

Figure 17:
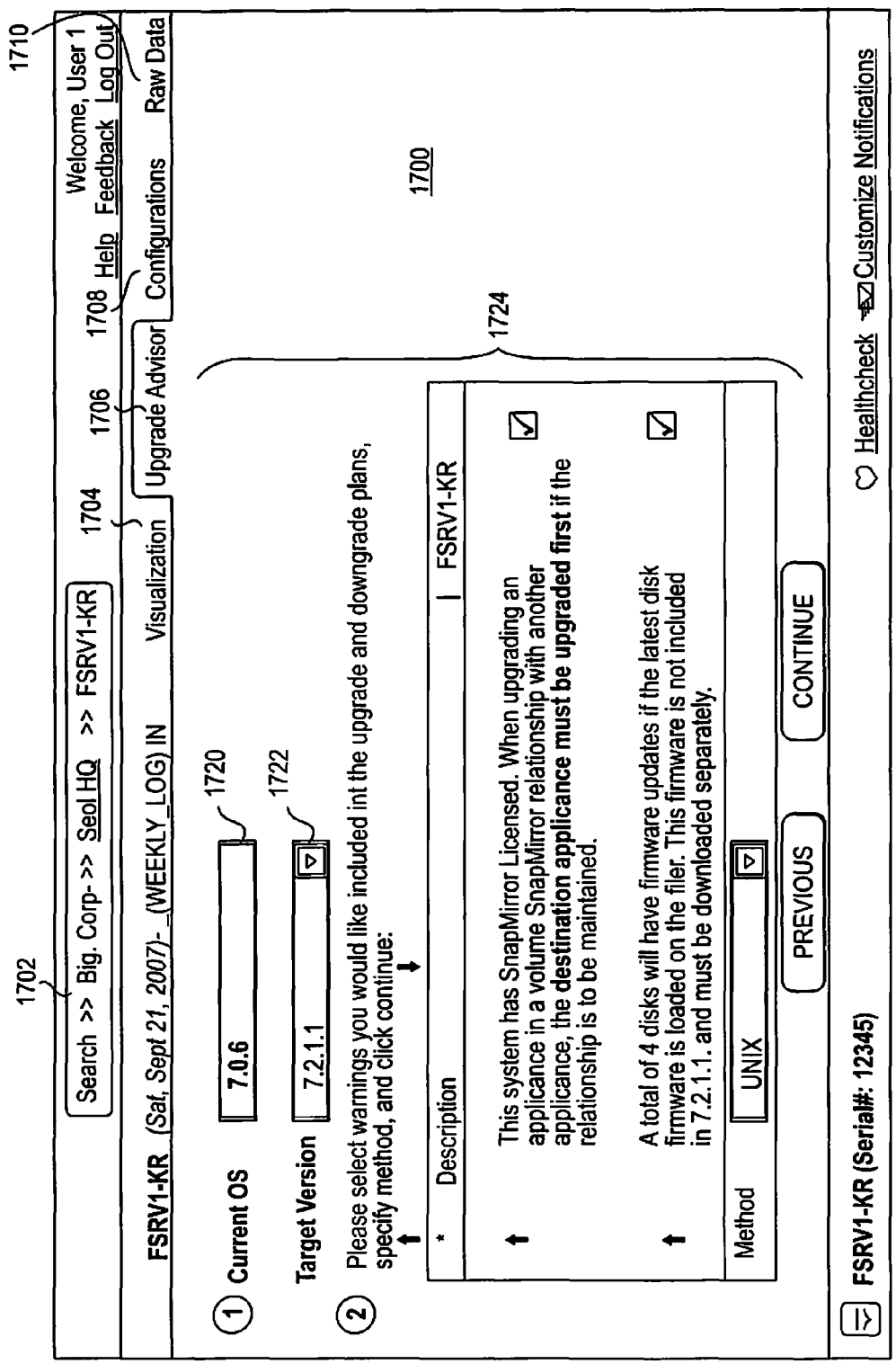
FIG. 17 is a diagram of an exemplary screen showing upgrade options for an operating system of the storage system.

FIG. 17 is a diagram of an exemplary screen 1700 showing upgrade instructions to upgrade an operating system running on the storage system. The screen 1700 includes location information 1702 (i.e., a "breadcrumb trail") indicating where in the system hierarchy the administrator is currently viewing. The administrator can navigate via various tabs, including a visualization tab 1704, an upgrade advisor tab 1706, a configurations tab 1708, and a raw data tab 1710.

Information relating to the currently running OS version 1720 on the selected entity is shown along with a list 1722 of possible OS version upgrade choices. The number of items in the list 1722 depends on how many different OS versions exist that are more recent than the currently running OS version. Selecting a version to upgrade to from the list 1722 to displays a set of instructions 1724 on how to upgrade the OS to the selected version. The administrator can follow the set of instructions 1724 to manually upgrade the OS on the selected entity. It is noted that the information shown on the screen 1700 is exemplary and that one skilled in the art can create different arrangements of the elements.

Viewing System Configurations

Figure 18:
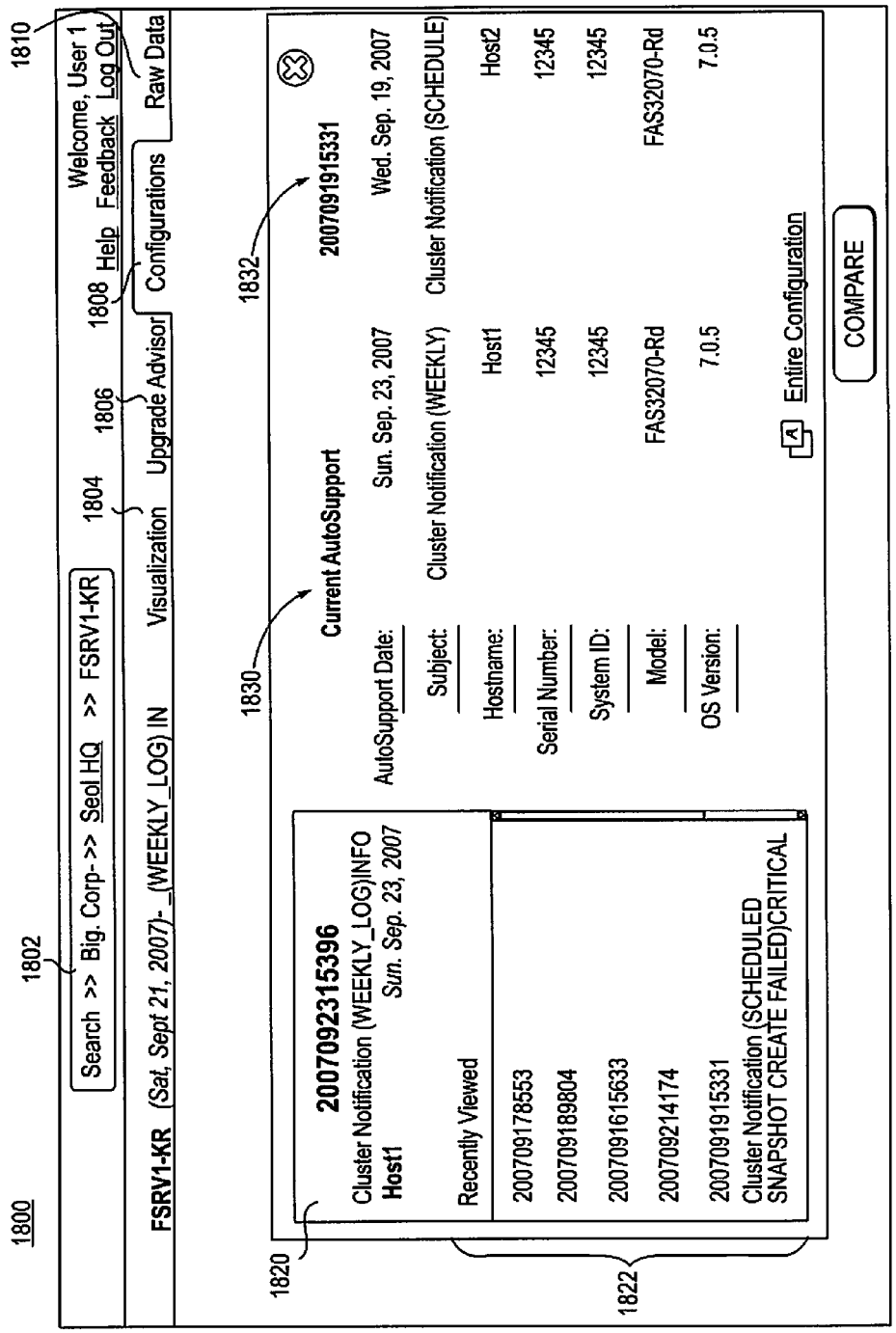
FIG. 18 is a diagram of an exemplary screen showing a comparison between storage system configurations at two different points in time.

FIG. 18 is a diagram of an exemplary screen 1800 showing a comparison between storage system configurations at different points in time. The screen 1800 includes location information 1802 (i.e., a "breadcrumb trail") indicating where in the system hierarchy the administrator is currently viewing. The administrator can navigate via various tabs, including a visualization tab 1804, an upgrade advisor tab 1806, a configurations tab 1808, and a raw data tab 1810. The screen 1800 includes an event identifier 1820 that corresponds to the currently selected event and a list 1822 of recent viewed events.

The screen 1800 shows details 1830 regarding the currently selected event 1820, including the date and time of the event, the subject of the event, the hostname of the entity where the event occurred, the serial number of the entity, the system ID for the entity, the model number of the entity, and the OS version that the entity was running at the time of the event. It is noted that additional information regarding the event and the entity that generated the event can be displayed. In one embodiment, the event is an AutoSupport with an attribute timestamp.

A second event 1832 can be compared to the currently selected event 1830, in order for the administrator to compare the configurations between the two entities at the times that the corresponding events were generated. Information regarding the second event 1832 similar to that shown for event 1830 can be displayed to facilitate comparison. The events 1830, 1832 that can be compared can be from the same entity at different points in time, from different entities at points close in time (or at the same time, if events were generated by different entities at the same time), or from different entities at different points in time. One reason for performing a side by side comparison of different events is to help determine if a configuration difference may have been the cause of the later event.

It is noted that while two events are shown being compared, any number of events displaying similar information can be displayed for comparison. It is further noted that the information shown on the screen 1800 is exemplary and that one skilled in the art can create different arrangements of the elements.

FIG. 19 is a diagram of an exemplary screen 1900 showing a storage system configuration template creation and comparison. A template is a previously created configuration for an entity on the administrator's system. For example, the template may include information regarding a recommended configuration for a particular entity. Over time, the administrator may make changes to the entity that deviate from the template's configuration. If an error later occurs, it may be useful in diagnosing the error to compare the current configuration of the entity to the template to determine which elements have been changed.

The screen 1900 includes location information 1902 (i.e., a "breadcrumb trail") indicating where in the system hierarchy the administrator is currently viewing. The administrator can navigate via various tabs, including a visualization tab 1904, an upgrade advisor tab 1906, a configurations tab 1908, and a raw data tab 1910. The screen 1900 includes an event identifier 1920 that corresponds to the currently selected event and a list 1922 of recent viewed events.

The screen 1900 shows details 1930 regarding the currently selected event 1920, including the date of the event, the subject of the event, the hostname of the entity where the event occurred, the serial number of the entity, the system ID for the entity, the model number of the entity, and the OS version that the entity was running at the time of the event. It is noted that additional information regarding the event and the entity that generated the event can be displayed.

The administrator can save the configuration of the entity that generated the event 1930 as a template via the save section 1932. The administrator can also select a template to be used to compare the event 1930 against via the selection element 1934. Comparing the event 1930 against a template is similar to comparing two events as shown in screen 1800 of FIG. 18.

In an alternate embodiment, the comparison may be automated, in that when an event is generated, the configuration of the entity at the time the event is generated is automatically compared to the entity's template. A summary of the configuration differences between the event and the template can be presented to the administrator or the screen 1800 (FIG. 18) can be used to display the comparison.

It is noted that the information shown on the screen 1900 is exemplary and that one skilled in the art can create different arrangements of the elements.

Raw Data Display

Figure 20:
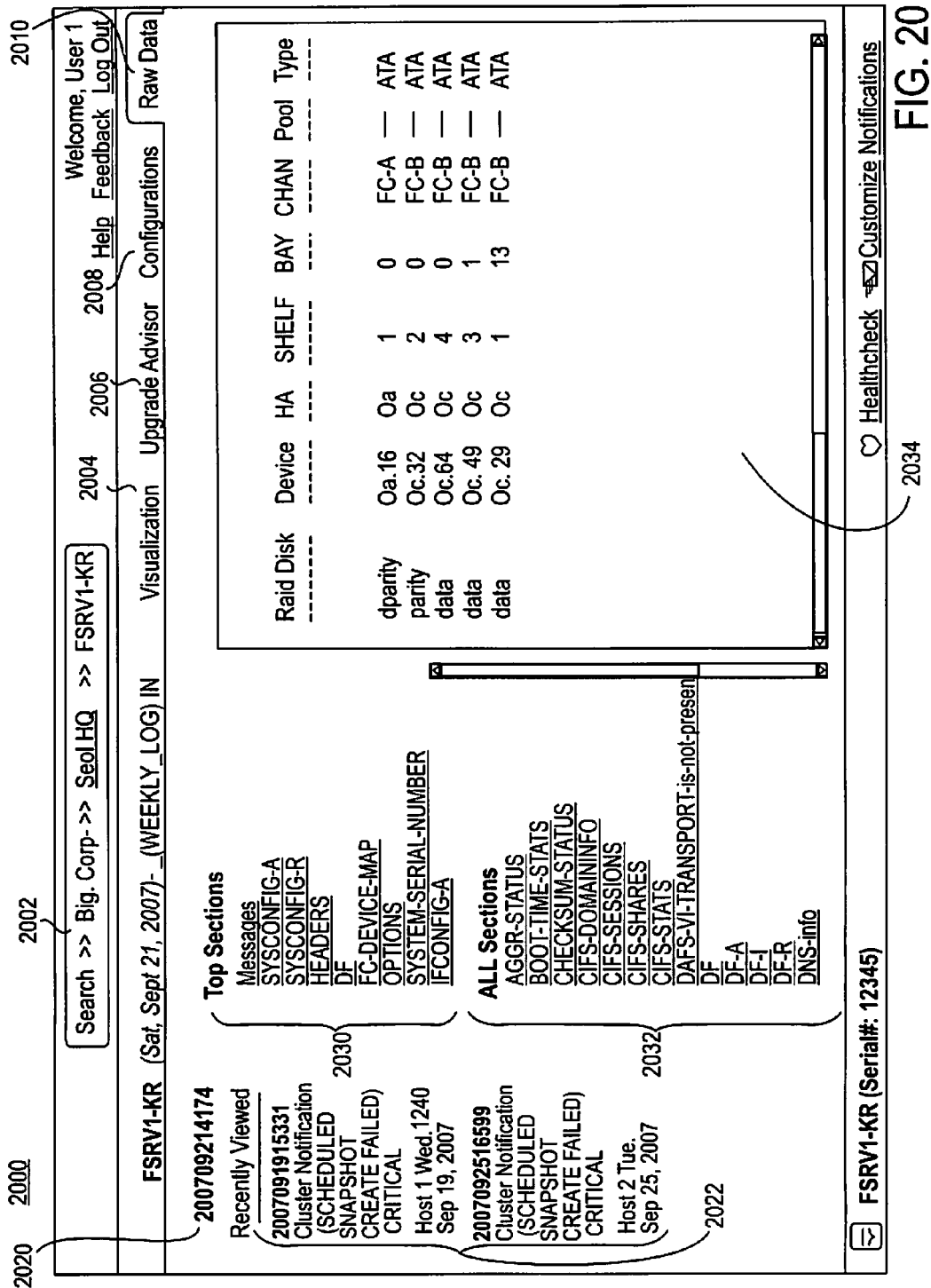
FIG. 20 is a diagram of an exemplary screen showing raw data for an event that occurred in the storage system.

FIG. 20 is a diagram of an exemplary screen 2000 showing raw data for an event that occurred in the storage system. The screen 2000 includes location information 2002 (i.e., a "breadcrumb trail") indicating where in the system hierarchy the administrator is currently viewing. The administrator can navigate via various tabs, including a visualization tab 2004, an upgrade advisor tab 2006, a configurations tab 2008, and a raw data tab 2010. The screen 2000 includes an event identifier 2020 that corresponds to the currently selected event and a list 2022 of recent viewed events.

The raw data relates to the information that is stored when an event of any type is generated. The screen 2000 allows the administrator to easily browse this information. For the selected event 2020, the administrator can view a section 2030 of the raw data or a subsection 2032 of the raw data. Any selection 2030 or 2032 will be displayed in the viewing window 2034. It is noted that the information shown on the screen 2000 is exemplary and that one skilled in the art can create different arrangements of the elements.

The present invention can be implemented in a computer program tangibly embodied in a computer-readable storage medium containing a set of instructions for execution by a processor or a general purpose computer; and method steps of the invention can be performed by a processor executing a program of instructions to perform functions of the invention by operating on input data and generating output data. Suitable processors include, by way of example, both general and special purpose processors. Typically, a processor will receive instructions and data from a ROM, a random access memory (RAM), and/or a storage device. Storage devices suitable for embodying computer program instructions and data include all forms of non-volatile memory, including by way of example semiconductor memory devices, magnetic media such as internal hard disks and removable disks, magneto-optical media, and optical media such as CD-ROM disks and digital versatile disks (DVDs). In addition, while the illustrative embodiments may be implemented in computer software, the functions within the illustrative embodiments may alternatively be embodied in part or in whole using hardware components such as Application Specific Integrated Circuits (ASICs), Field Programmable Gate Arrays (FPGAs), or other hardware, or in some combination of hardware components and software components.

While specific embodiments of the present invention have been shown and described, many modifications and variations could be made by one skilled in the art without departing from the scope of the invention. The above description serves to illustrate and not limit the particular invention in any way.

What is claimed is:

1. A graphical user interface (GUI) comprising:
an entity graph element configured to show a graphical relationship between entities in a data storage system via an entity graph, the entity graph element configured to dynamically construct the entity graph based on a current selected entity such that the entity graph is navigable in real-time through a hierarchical structure of the data storage system by selecting one or more of the entities;
a timeline element configured to show a timeline of historical events related to the current selected entity, wherein the entity graph element is further configured to dynamically construct the entity graph in real-time based on a current selected historical event such that the entity graph is temporally navigable in real-time by selecting one or more of the historical events;
a location information element configured to show a path through the hierarchical structure of the storage system from a top-level entity in the storage system to the current selected entity; and
a status element configured to show status information about the current selected entity.

2. The GUI according to claim 1, wherein the entity graph element is further configured to dynamically construct the entity graph in real-time based on a state of the data storage system at the time of the current selected historical event.

3. The GUI according to claim 1, wherein each point on the entity graph is provided with a uniform resource identifier such that the graph can be visually browsed via any point on the graph.

4. The GUI according to claim 1, wherein the entity graph can be navigated by clicking and dragging a point on the graph.

5. The GUI according to claim 1, wherein additional information regarding a point on the entity graph is displayed by placing a cursor over the desired point on the graph.

6. The GUI according to claim 1, further comprising: a search element configured to search for a particular entity in the storage system.

7. The GUI according to claim 1, further comprising:
an entity detail element configured to show details about the current selected entity.

8. The GUI according to claim 1, wherein the data storage system is a clustered file server system comprising a plurality of nodes interconnected by a switching fabric, each node including:
a network module configured to enable the node to communicate with other nodes and other entities;
a disk module configured to enable the node to connect to one or more disks; and
a management module configured to provide management functions for the node.

9. The GUI according to claim 1, wherein the timeline element is configured to display instructions for upgrading the data storage system based on an operating system version running at the time of the current selected historical event.

10. The GUI according to claim 1, wherein the entity graph element is configured to dynamically construct the entity graph in real-time based on the current selected entity such that the entity graph is substantially centered on the current selected entity.

11. An apparatus comprising:
a memory;
a processor;
a list element configured to show a listing all of the entities in the data storage system, the list element configured to dynamically construct the listing in real-time based on a current selected entity such that the listing is navigable in real-time through a hierarchical structure of the data storage system by selecting one or more of the entities;
a timeline element configured to show a timeline of historical events related to the current selected entity, wherein the list element is further configured to dynamically construct the listing in real-time based on a current selected historical event such that the listing is temporally navigable in real-time by selecting one or more of the historical events;
a location information element configured to show a path through the hierarchical structure of the storage system from a top-level entity in the storage system to the current selected entity in the list element; and
a status element configured to show status information about the current selected entity in the list element.

12. The apparatus according to claim 11, wherein the list element dynamically constructs the listing in real-time based on a state of the data storage system at the time of the current selected historical event.

13. The apparatus according to claim 11, wherein each element in the list element is provided with a uniform resource identifier such that the list can be browsed via any element in the list.

14. The apparatus according to claim 11, further comprising:
a search element configured to search for a particular entity in the storage system.

15. The apparatus according to claim 11, wherein the storage system is a clustered file server system comprising a plurality of nodes interconnected by a switching fabric, each node including:

a network module configured to enable the node to communicate with other nodes and other entities;

a disk module configured to enable the node to connect to one or more disks; and a management module configured to provide management functions for the node.

16. A method comprising:

receiving, at a computer system, information related to a data storage system including real-time events occurring in a set of storage devices operatively coupled to the data storage system;

generating, at the computer system, a graphical user interface for visually browsing the data storage system;

receiving, at the computer system, a selection made via the graphical user interface indicating an entity in the data storage system;

determining, at the computer system, a location in the data storage system corresponding to the selected entity and status information about the selected entity in response to receiving the selection; and dynamically constructing, at the computer system, an entity graph of the data storage system based on the selected entity, the entity graph showing a graphical relationship between the entities in the data storage system such that, the entity graph is navigable in real-time through a hierarchical structure of the data storage system by selecting one or more of the entities.

17. The method as recited in claim 16, further comprising:

dynamically constructing, at the computer system, a timeline of historical events related to the selected entity;

receiving, at the computer system, a selection made via the graphical user interface indicating a historical event from the timeline of historical events related to the selected entity; and dynamically constructing, at the computer system, the entity graph in real-time based on the selected historical event such that the entity graph is temporally navigable in real-time by selecting one or more of the historical events.

18. The method as recited in claim 17, wherein dynamically constructing the entity graph in real-time based on the selected historical event includes constructing the entity graph based on a state of the data storage system at the time of the current selected historical event.

19. The method as recited in claim 16 wherein constructing the entity graph comprises generating each point on the graph with a uniform resource identifier such that the graph can be visually browsed via any point on the graph.

20. The method as recited in claim 19, wherein the entity graph can be visually browsed via the graphical user interface by clicking and dragging a point on the graph.

* * * * *

UNITED STATES PATENT AND TRADEMARK OFFICE
CERTIFICATE OF CORRECTION

PATENT NO. : 8,443,011 B2  
APPLICATION NO. : 12/114437  
DATED : May 14, 2013  
INVENTOR(S) : Yogesh Kandlikar et al.

Page 1 of 1

It is certified that error appears in the above-identified patent and that said Letters Patent is hereby corrected as shown below:

In the Claims

In column 17, line 24, in claim 16, delete "that," and insert -- that --, therefor.

Signed and Sealed this
Eleventh Day of February, 2014

Michelle K. Lee
*Deputy Director of the United States Patent and Trademark Office*